United States Patent
Boutros et al.

(10) Patent No.: US 11,451,413 B2
(45) Date of Patent: Sep. 20, 2022

(54) METHOD FOR ADVERTISING AVAILABILITY OF DISTRIBUTED GATEWAY SERVICE AND MACHINES AT HOST COMPUTER

(71) Applicant: VMware, Inc., Palo Alto, CA (US)

(72) Inventors: Sami Boutros, Union City, CA (US); Anirban Sengupta, Saratoga, CA (US); Mani Kancherla, Cupertino, CA (US); Jerome Catrouillet, Palo Alto, CA (US); Sri Mohana Singamsetty, Cupertino, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/941,467

(22) Filed: Jul. 28, 2020

(65) Prior Publication Data
US 2022/0038309 A1  Feb. 3, 2022

(51) Int. Cl.
*H04L 12/46* (2006.01)
*H04L 29/08* (2006.01)
(Continued)

(52) U.S. Cl.
CPC .......... *H04L 12/4641* (2013.01); *H04L 12/66* (2013.01); *H04L 45/04* (2013.01);
(Continued)

(58) Field of Classification Search
CPC ..... H04L 12/4641; H04L 12/66; H04L 45/04; H04L 45/586; H04L 61/251; H04L 67/1002; H04L 69/08
See application file for complete search history.

(56) References Cited

U.S. PATENT DOCUMENTS

| | | |
|---|---|---|
| 5,504,921 A | 4/1996 | Dev et al. |
| 5,550,816 A | 8/1996 | Hardwick et al. |
| 5,751,967 A | 5/1998 | Raab et al. |
| 6,006,275 A | 12/1999 | Picazo et al. |
| 6,104,699 A | 8/2000 | Holender et al. |

(Continued)

FOREIGN PATENT DOCUMENTS

| | | |
|---|---|---|
| EP | 1653688 A1 | 5/2006 |
| EP | 2882151 A1 | 6/2015 |

(Continued)

OTHER PUBLICATIONS

Casado, Martin, et al., "Virtualizing the Network Forwarding Plane," Dec. 2010, 6 pages.

(Continued)

*Primary Examiner* — Kevin C. Harper
*Assistant Examiner* — Derrick V Rose
(74) *Attorney, Agent, or Firm* — Adeli LLP

(57) ABSTRACT

Some embodiments of the invention provide a novel network architecture for advertising routes in an availability zone (AZ). The novel network architecture includes a set of route servers for receiving advertisements of network addresses as being available in the AZ from different routers in the AZ. The novel network architecture also includes multiple host computers that each execute a router that (i) identifies network addresses available on the host computer, (ii) sends advertisements of the identified network addresses to the set of route servers, and (iii) receives advertisements from the set of route servers regarding network addresses available on other host computers. The identified network addresses, in some embodiments, include at least one of network addresses associated with data compute nodes (DCNs) and network addresses associated with services available at the host computer. The route servers advertise the received network addresses to other routers in the AZ.

15 Claims, 13 Drawing Sheets

(51) Int. Cl.
*H04L 12/713* (2013.01)
*H04L 12/715* (2013.01)
*H04L 29/12* (2006.01)
*H04L 67/1001* (2022.01)
*H04L 45/586* (2022.01)
*H04L 69/08* (2022.01)
*H04L 61/251* (2022.01)
*H04L 12/66* (2006.01)
*H04L 45/02* (2022.01)

(52) U.S. Cl.
CPC .......... *H04L 45/586* (2013.01); *H04L 61/251* (2013.01); *H04L 67/1002* (2013.01); *H04L 69/08* (2013.01)

(56) References Cited

U.S. PATENT DOCUMENTS

| | | | |
|---|---|---|---|
| 6,219,699 B1 | 4/2001 | McCloghrie et al. | |
| 6,359,909 B1 | 3/2002 | Ito et al. | |
| 6,456,624 B1 | 9/2002 | Eccles et al. | |
| 6,512,745 B1 | 1/2003 | Abe et al. | |
| 6,539,432 B1 | 3/2003 | Taguchi et al. | |
| 6,680,934 B1 | 1/2004 | Cain | |
| 6,785,843 B1 | 8/2004 | McRae et al. | |
| 6,941,487 B1 | 9/2005 | Balakrishnan et al. | |
| 6,950,428 B1 | 9/2005 | Horst et al. | |
| 6,963,585 B1 | 11/2005 | Pennec et al. | |
| 6,999,454 B1 | 2/2006 | Crump | |
| 7,046,630 B2 | 5/2006 | Abe et al. | |
| 7,197,572 B2 | 3/2007 | Matters et al. | |
| 7,200,144 B2 | 4/2007 | Terrell et al. | |
| 7,209,439 B2 | 4/2007 | Rawlins et al. | |
| 7,260,648 B2 | 8/2007 | Tingley et al. | |
| 7,283,473 B2 | 10/2007 | Arndt et al. | |
| 7,302,484 B1 | 11/2007 | Stapp et al. | |
| 7,342,916 B2 | 3/2008 | Das et al. | |
| 7,391,771 B2 | 6/2008 | Orava et al. | |
| 7,450,598 B2 | 11/2008 | Chen et al. | |
| 7,463,579 B2 | 12/2008 | Lapuh et al. | |
| 7,478,173 B1 | 1/2009 | Delco | |
| 7,483,411 B2 | 1/2009 | Weinstein et al. | |
| 7,555,002 B2 | 6/2009 | Arndt et al. | |
| 7,606,260 B2 | 10/2009 | Oguchi et al. | |
| 7,643,488 B2 | 1/2010 | Khanna et al. | |
| 7,649,851 B2 | 1/2010 | Takashige et al. | |
| 7,710,874 B2 | 5/2010 | Balakrishnan et al. | |
| 7,764,599 B2 | 7/2010 | Doi et al. | |
| 7,792,987 B1 | 9/2010 | Vohra et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,885,276 B1 | 2/2011 | Lin | |
| 7,936,770 B1 | 5/2011 | Frattura et al. | |
| 7,937,438 B1 | 5/2011 | Miller et al. | |
| 7,948,986 B1 | 5/2011 | Ghosh et al. | |
| 7,953,865 B1 | 5/2011 | Miller et al. | |
| 7,991,859 B1 | 8/2011 | Miller et al. | |
| 7,995,483 B1 | 8/2011 | Bayar et al. | |
| 8,027,354 B1 | 9/2011 | Portolani et al. | |
| 8,031,633 B2 | 10/2011 | Bueno et al. | |
| 8,046,456 B1 | 10/2011 | Miller et al. | |
| 8,054,832 B1 | 11/2011 | Shukla et al. | |
| 8,055,789 B2 | 11/2011 | Richardson et al. | |
| 8,060,875 B1 | 11/2011 | Lambeth | |
| 8,131,852 B1 | 3/2012 | Miller et al. | |
| 8,149,737 B2 | 4/2012 | Metke et al. | |
| 8,155,028 B2 | 4/2012 | Abu-Hamdeh et al. | |
| 8,166,201 B2 | 4/2012 | Richardson et al. | |
| 8,194,674 B1 | 6/2012 | Pagel et al. | |
| 8,199,750 B1 | 6/2012 | Schultz et al. | |
| 8,223,668 B2 | 7/2012 | Allan et al. | |
| 8,224,931 B1 | 7/2012 | Brandwine et al. | |
| 8,224,971 B1 | 7/2012 | Miller et al. | |
| 8,239,572 B1 | 8/2012 | Brandwine et al. | |
| 8,259,571 B1 | 9/2012 | Raphel et al. | |
| 8,265,075 B2 | 9/2012 | Pandey | |
| 8,281,067 B2 | 10/2012 | Stolowitz | |
| 8,312,129 B1 | 11/2012 | Miller et al. | |
| 8,339,959 B1 | 12/2012 | Moisand et al. | |
| 8,339,994 B2 | 12/2012 | Gnanasekaran et al. | |
| 8,345,650 B2 | 1/2013 | Foxworthy et al. | |
| 8,351,418 B2 | 1/2013 | Zhao et al. | |
| 8,370,834 B2 | 2/2013 | Edwards et al. | |
| 8,456,984 B2 | 6/2013 | Ranganathan et al. | |
| 8,504,718 B2 | 8/2013 | Wang et al. | |
| 8,565,108 B1 | 10/2013 | Marshall et al. | |
| 8,611,351 B2 | 12/2013 | Gooch et al. | |
| 8,612,627 B1 | 12/2013 | Brandwine | |
| 8,625,594 B2 | 1/2014 | Safrai et al. | |
| 8,625,603 B1 | 1/2014 | Ramakrishnan et al. | |
| 8,625,616 B2 | 1/2014 | Vobbilisetty et al. | |
| 8,627,313 B2 | 1/2014 | Edwards et al. | |
| 8,644,188 B1 | 2/2014 | Brandwine et al. | |
| 8,660,129 B1 | 2/2014 | Brendel et al. | |
| 8,705,513 B2 | 4/2014 | Merwe et al. | |
| 8,958,298 B2 | 2/2015 | Zhang et al. | |
| 9,059,999 B2 | 6/2015 | Koponen et al. | |
| 10,063,458 B2 | 8/2018 | Zhang et al. | |
| 10,212,071 B2 | 2/2019 | Kancherla et al. | |
| 10,693,763 B2 | 6/2020 | Zhang et al. | |
| 10,742,746 B2 | 8/2020 | Kancherla et al. | |
| 10,826,827 B1 * | 11/2020 | Natal | H04L 45/64 |
| 11,095,480 B2 | 8/2021 | Natarajan et al. | |
| 11,159,343 B2 | 10/2021 | Natarajan et al. | |
| 2001/0043614 A1 | 11/2001 | Viswanadham et al. | |
| 2002/0093952 A1 | 7/2002 | Gonda | |
| 2002/0186705 A1 | 12/2002 | Kadambi et al. | |
| 2002/0194369 A1 | 12/2002 | Rawlins et al. | |
| 2003/0041170 A1 | 2/2003 | Suzuki | |
| 2003/0058850 A1 | 3/2003 | Rangarajan et al. | |
| 2003/0069972 A1 | 4/2003 | Yoshimura et al. | |
| 2003/0179742 A1 | 9/2003 | Ogier et al. | |
| 2003/0225857 A1 | 12/2003 | Flynn et al. | |
| 2004/0073659 A1 | 4/2004 | Rajsic et al. | |
| 2004/0098505 A1 | 5/2004 | Clemmensen | |
| 2004/0267866 A1 | 12/2004 | Carollo et al. | |
| 2005/0018669 A1 | 1/2005 | Arndt et al. | |
| 2005/0027881 A1 | 2/2005 | Figueira et al. | |
| 2005/0053079 A1 | 3/2005 | Havala | |
| 2005/0083953 A1 | 4/2005 | May | |
| 2005/0120160 A1 | 6/2005 | Plouffe et al. | |
| 2005/0132044 A1 | 6/2005 | Guingo et al. | |
| 2006/0002370 A1 | 1/2006 | Rabie et al. | |
| 2006/0018253 A1 | 1/2006 | Windisch et al. | |
| 2006/0026225 A1 | 2/2006 | Canali et al. | |
| 2006/0029056 A1 | 2/2006 | Perera et al. | |
| 2006/0056412 A1 | 3/2006 | Page | |
| 2006/0092940 A1 | 5/2006 | Ansari et al. | |
| 2006/0092976 A1 | 5/2006 | Lakshman et al. | |
| 2006/0174087 A1 | 8/2006 | Hashimoto et al. | |
| 2006/0187908 A1 | 8/2006 | Shimozono et al. | |
| 2006/0193266 A1 | 8/2006 | Siddha et al. | |
| 2006/0291388 A1 | 12/2006 | Amdahl et al. | |
| 2007/0043860 A1 | 2/2007 | Pabari | |
| 2007/0064673 A1 | 3/2007 | Bhandaru et al. | |
| 2007/0140128 A1 | 6/2007 | Klinker et al. | |
| 2007/0156919 A1 | 7/2007 | Potti et al. | |
| 2007/0201357 A1 | 8/2007 | Smethurst et al. | |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0013474 A1 | 1/2008 | Nagarajan et al. | |
| 2008/0049621 A1 | 2/2008 | McGuire et al. | |
| 2008/0049646 A1 | 2/2008 | Lu | |
| 2008/0059556 A1 | 3/2008 | Greenspan et al. | |
| 2008/0071900 A1 | 3/2008 | Hecker et al. | |
| 2008/0086726 A1 | 4/2008 | Griffith et al. | |
| 2008/0151893 A1 | 6/2008 | Nordmark et al. | |
| 2008/0159301 A1 | 7/2008 | Heer | |
| 2008/0189769 A1 | 8/2008 | Casado et al. | |
| 2008/0225853 A1 | 9/2008 | Melman et al. | |
| 2008/0240122 A1 | 10/2008 | Richardson et al. | |
| 2008/0253366 A1 | 10/2008 | Zuk et al. | |

(56) References Cited

U.S. PATENT DOCUMENTS

| | | |
|---|---|---|
| 2008/0263205 A1 | 10/2008 | Naseh |
| 2008/0291910 A1 | 11/2008 | Tadimeti et al. |
| 2009/0031041 A1 | 1/2009 | Clemmensen |
| 2009/0043823 A1 | 2/2009 | Iftode et al. |
| 2009/0083445 A1 | 3/2009 | Ganga |
| 2009/0092137 A1 | 4/2009 | Haigh et al. |
| 2009/0122710 A1 | 5/2009 | Bar-Tor et al. |
| 2009/0150527 A1 | 6/2009 | Tripathi et al. |
| 2009/0161547 A1 | 6/2009 | Riddle et al. |
| 2009/0249470 A1 | 10/2009 | Litvin et al. |
| 2009/0249473 A1 | 10/2009 | Cohn |
| 2009/0279536 A1 | 11/2009 | Unbehagen et al. |
| 2009/0292858 A1 | 11/2009 | Lambeth et al. |
| 2009/0300210 A1 | 12/2009 | Ferris |
| 2009/0303880 A1 | 12/2009 | Maltz et al. |
| 2010/0002722 A1 | 1/2010 | Porat et al. |
| 2010/0046531 A1 | 2/2010 | Louati et al. |
| 2010/0107162 A1 | 4/2010 | Edwards et al. |
| 2010/0115101 A1 | 5/2010 | Lain et al. |
| 2010/0131636 A1 | 5/2010 | Suri et al. |
| 2010/0153554 A1 | 6/2010 | Anschutz et al. |
| 2010/0153701 A1 | 6/2010 | Shenoy et al. |
| 2010/0162036 A1 | 6/2010 | Linden et al. |
| 2010/0165877 A1 | 7/2010 | Shukla et al. |
| 2010/0169467 A1 | 7/2010 | Shukla et al. |
| 2010/0175125 A1 | 7/2010 | McDysan |
| 2010/0192225 A1 | 7/2010 | Ma et al. |
| 2010/0205479 A1 | 8/2010 | Akutsu et al. |
| 2010/0214949 A1 | 8/2010 | Smith et al. |
| 2010/0275199 A1 | 10/2010 | Smith et al. |
| 2010/0290485 A1 | 11/2010 | Martini et al. |
| 2010/0318609 A1 | 12/2010 | Lahiri et al. |
| 2010/0322255 A1 | 12/2010 | Hao et al. |
| 2011/0016215 A1 | 1/2011 | Wang |
| 2011/0022695 A1 | 1/2011 | Dalal et al. |
| 2011/0026537 A1 | 2/2011 | Kolhi et al. |
| 2011/0032830 A1 | 2/2011 | Merwe et al. |
| 2011/0075664 A1 | 3/2011 | Lambeth et al. |
| 2011/0075674 A1 | 3/2011 | Li et al. |
| 2011/0085557 A1 | 4/2011 | Gnanasekaran et al. |
| 2011/0085559 A1 | 4/2011 | Chung et al. |
| 2011/0110374 A1 | 5/2011 | Boucadair et al. |
| 2011/0119748 A1 | 5/2011 | Edwards et al. |
| 2011/0134931 A1 | 6/2011 | Merwe et al. |
| 2011/0142053 A1 | 6/2011 | Merwe et al. |
| 2011/0145390 A1 | 6/2011 | Kakadia et al. |
| 2011/0194567 A1 | 8/2011 | Shen |
| 2011/0202675 A1 | 8/2011 | Faulk, Jr. |
| 2011/0261825 A1 | 10/2011 | Ichino |
| 2011/0283017 A1 | 11/2011 | Alkhatib et al. |
| 2011/0299534 A1 | 12/2011 | Koganti et al. |
| 2011/0310899 A1 | 12/2011 | Alkhatib et al. |
| 2011/0317703 A1 | 12/2011 | Dunbar et al. |
| 2012/0014386 A1 | 1/2012 | Xiong et al. |
| 2012/0014387 A1 | 1/2012 | Dunbar et al. |
| 2012/0039338 A1 | 2/2012 | Morimoto |
| 2012/0066371 A1 | 3/2012 | Patel et al. |
| 2012/0096159 A1 | 4/2012 | Short et al. |
| 2012/0099591 A1 | 4/2012 | Kotha et al. |
| 2012/0131643 A1 | 5/2012 | Cheriton |
| 2012/0144014 A1 | 6/2012 | Natham et al. |
| 2012/0173757 A1 | 7/2012 | Sanden |
| 2012/0182992 A1 | 7/2012 | Cowart et al. |
| 2012/0236734 A1 | 9/2012 | Sampath et al. |
| 2012/0278802 A1 | 11/2012 | Nilakantan et al. |
| 2013/0007740 A1 | 1/2013 | Kikuchi et al. |
| 2013/0044636 A1 | 2/2013 | Koponen et al. |
| 2013/0044641 A1 | 2/2013 | Koponen et al. |
| 2013/0058346 A1 | 3/2013 | Sridharan et al. |
| 2013/0070745 A1 | 3/2013 | Nixon et al. |
| 2013/0089097 A1 | 4/2013 | Filsfils et al. |
| 2013/0125120 A1 | 5/2013 | Zhang et al. |
| 2013/0142048 A1 | 6/2013 | Gross, IV et al. |
| 2013/0145002 A1 | 6/2013 | Kannan et al. |
| 2013/0148541 A1 | 6/2013 | Zhang et al. |
| 2013/0148542 A1 | 6/2013 | Zhang et al. |
| 2013/0148543 A1 | 6/2013 | Koponen et al. |
| 2013/0148656 A1 | 6/2013 | Zhang et al. |
| 2013/0151661 A1 | 6/2013 | Koponen et al. |
| 2013/0151676 A1 | 6/2013 | Thakkar et al. |
| 2013/0201989 A1 | 8/2013 | Hu et al. |
| 2013/0266015 A1 | 10/2013 | Qu et al. |
| 2013/0266019 A1 | 10/2013 | Qu et al. |
| 2013/0268799 A1 | 10/2013 | Mestery et al. |
| 2013/0329548 A1 | 12/2013 | Nakil et al. |
| 2013/0339544 A1 | 12/2013 | Mithyantha |
| 2014/0003434 A1 | 1/2014 | Assarpour et al. |
| 2014/0016501 A1 | 1/2014 | Kamath et al. |
| 2014/0195666 A1 | 7/2014 | Dumitriu et al. |
| 2014/0207968 A1 | 7/2014 | Kumar et al. |
| 2014/0310418 A1 | 10/2014 | Sorenson et al. |
| 2015/0063364 A1 | 3/2015 | Thakkar et al. |
| 2015/0103838 A1 | 4/2015 | Zhang et al. |
| 2015/0117454 A1 | 4/2015 | Koponen et al. |
| 2015/0189009 A1 | 7/2015 | Bemmel |
| 2015/0263946 A1* | 9/2015 | Tubaltsev ............... H04L 45/02 370/392 |
| 2015/0271303 A1 | 9/2015 | Neginhal et al. |
| 2016/0142257 A1 | 5/2016 | Udupi et al. |
| 2016/0198003 A1 | 7/2016 | Luft |
| 2016/0226762 A1 | 8/2016 | Zhang et al. |
| 2016/0335107 A1* | 11/2016 | Behera .................. H04L 69/329 |
| 2016/0380812 A1 | 12/2016 | Chanda et al. |
| 2017/0317954 A1 | 11/2017 | Masurekar et al. |
| 2018/0062923 A1 | 3/2018 | Katrekar et al. |
| 2018/0063231 A1 | 3/2018 | Park |
| 2018/0176124 A1 | 6/2018 | Kancherla et al. |
| 2018/0176307 A1 | 6/2018 | Kancherla et al. |
| 2019/0014032 A1 | 1/2019 | Zhang et al. |
| 2019/0020580 A1 | 1/2019 | Boutros et al. |
| 2019/0104413 A1 | 4/2019 | Cidon et al. |
| 2019/0173757 A1 | 6/2019 | Hira et al. |
| 2019/0342215 A1* | 11/2019 | Jain ..................... H04L 61/2084 |
| 2020/0036675 A1 | 1/2020 | Tarasuk-Levin |
| 2020/0287964 A1 | 9/2020 | Capper et al. |
| 2020/0366741 A1 | 11/2020 | Kancherla et al. |
| 2021/0067378 A1 | 3/2021 | Natarajan et al. |
| 2021/0067413 A1 | 3/2021 | Natarajan et al. |
| 2021/0203688 A1 | 7/2021 | Ghule et al. |
| 2021/0234898 A1* | 7/2021 | Desai .................. H04L 61/2557 |
| 2021/0385155 A1 | 12/2021 | Suryanarayana et al. |
| 2022/0021615 A1 | 1/2022 | Boutros et al. |
| 2022/0021645 A1 | 1/2022 | Boutros et al. |
| 2022/0030060 A1 | 1/2022 | Jain et al. |
| 2022/0038310 A1 | 2/2022 | Boutros et al. |
| 2022/0038379 A1 | 2/2022 | Boutros et al. |
| 2022/0045881 A1 | 2/2022 | Natarajan et al. |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 2005112390 A1 | 11/2005 |
| WO | 2008095010 A1 | 8/2008 |
| WO | 2021040933 A1 | 3/2021 |
| WO | 2022015394 A1 | 1/2022 |
| WO | 2022026012 A1 | 2/2022 |

OTHER PUBLICATIONS

Dumitriu, Dan Mihai, et al., (U.S. Appl. No. 61/514,990), filed Aug. 4, 2011, 31 pages.

Koponen, Teemu, et al., "Network Virtualization in Multi-tenant Datacenters," Technical Report TR-2013-001E, Aug. 2013, 22 pages, VMware, Inc., Palo Alto, CA, USA.

Non-Published Commonly Owned U.S. Appl. No. 16/573,874, filed Sep. 17, 2019, 37 pages, VMware, Inc.

Non-Published Commonly Owned U.S. Appl. No. 16/573,906, filed Sep. 17, 2019, 37 pages, VMware, Inc.

Non-Published Commonly Owned U.S. Appl. No. 16/931,196, filed Jul. 16, 2020, 58 pages, VMware, Inc.

(56) References Cited

OTHER PUBLICATIONS

Non-Published Commonly Owned U.S. Appl. No. 16/931,207, filed Jul. 16, 2020, 58 pages, VMware, Inc.
Non-Published Commonly Owned U.S. Appl. No. 16/938,733, filed Jul. 24, 2020, 25 pages, VMware, Inc.
Non-Published Commonly Owned Related U.S. Appl. No. 16/941,462 with similar specification, filed Jul. 28, 2020, 65 pages, VMware, Inc.
Non-Published Commonly Owned Related U.S. Appl. No. 16/941,473 with similar specification, filed Jul. 28, 2020, 65 pages, VMware, Inc.
Non-Published Commonly Owned U.S. Appl. No. 16/945,746, filed Jul. 31, 2020, 67 pages, Nicira, Inc.
Wang, Anjing, et al., "Network Virtualization: Technologies, Perspectives, and Frontiers," Journal of Lightwave Technology, Feb. 15, 2013, 15 pages, IEEE.
Non-Published commonly owned related International Patent Application PCT/US2021/030369 with similar specification, filed May 1, 2021, 67 pages, VMware, Inc.
Cui, Y., et al. "Lightweight 4over6: An Extension to the DS-Lite Architecture," draft-cui-softwire-b4-translated-ds-ite-11, Feb. 25, 2013, 17 pages, IETF Trust.
Non-Published Commonly Owned U.S. Appl. No. 17/510,296, filed Oct. 25, 2021, 44 pages, VMware, Inc.
PCT Invitation to Pay Additional Fees for Commonly Owned International Patent Application PCT/US2021/030369, dated Sep. 6, 2021, 15 pages, International Searching Authority (EPO).
Potter, F. J. M., et al., "The Integration of Ethernet Virtual Private Network in Kubernetes," Nov. 2019, 35 pages, retrieved from https://rp.os3.nl/2019-2020/p58/report.pdf.

\* cited by examiner

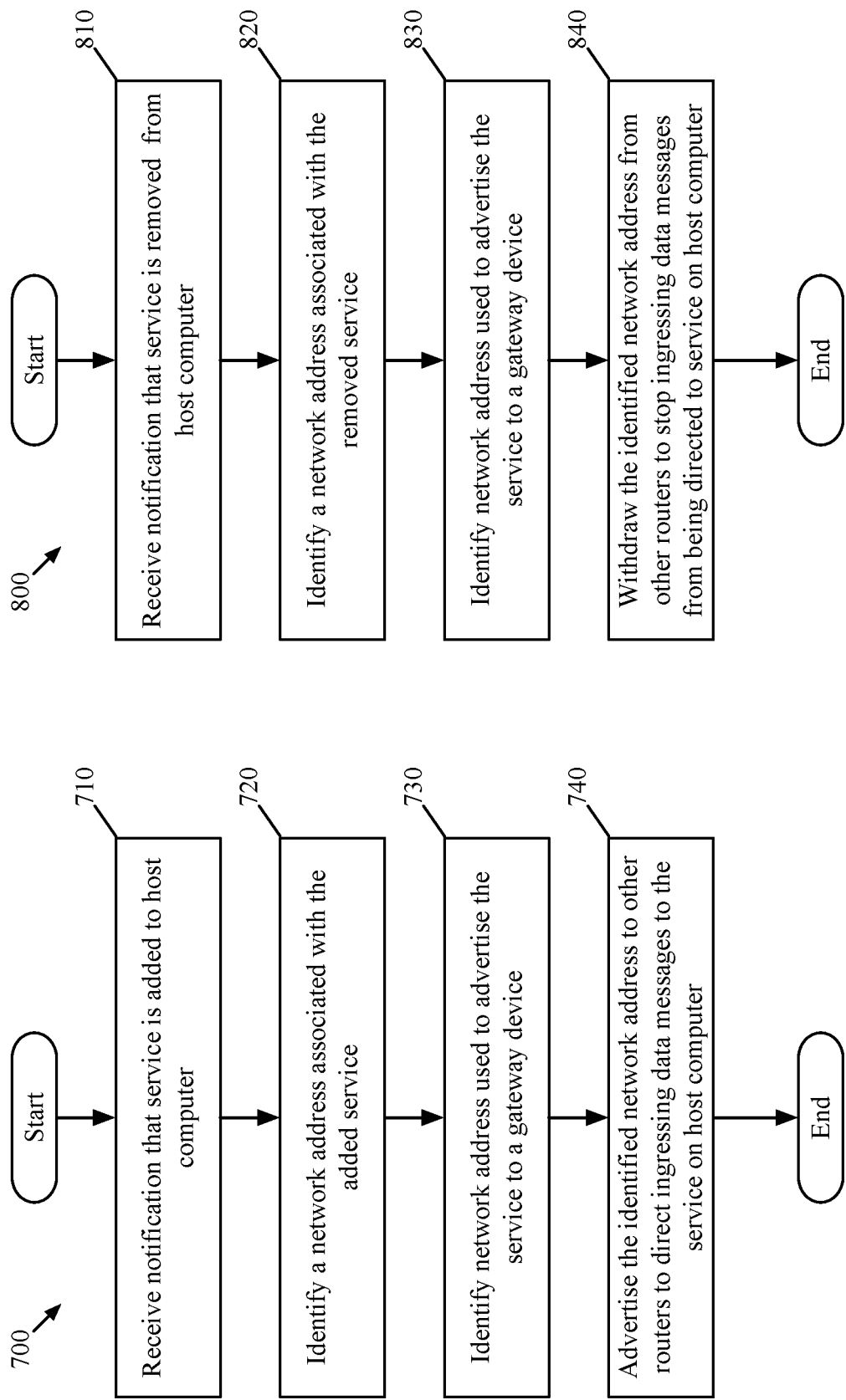

METHOD FOR ADVERTISING AVAILABILITY OF DISTRIBUTED GATEWAY SERVICE AND MACHINES AT HOST COMPUTER

BACKGROUND

Many networks rely on the use of stateful edge services that are provided at an edge of an availability zone (e.g., datacenter). Stateful services for some networks are provided at a limited number of state-maintaining devices (e.g., particular gateway devices at the edge of an availability zone (AZ)). However, providing stateful services at a limited number of devices can lead to bottlenecks as all traffic using the stateful service must be processed by the limited number of devices. To solve this bottleneck problem, some networks use a distributed stateful service architecture. However, a distributed stateful service architecture has its own challenges. For example, since the stateful service operation performed by each instance of the distributed stateful service requires state information, traffic traversing a provider gateway device in some cases will be forwarded to a randomly selected stateful service instance which for a system with "N" distributed stateful service instances will lead to a data message being directed to a distributed stateful service instance that does not store the state information for the data message (N−1) out of N times.

Accordingly, a solution that simultaneously solves the bottleneck and misdirection issues for providing stateful edge services such as SNAT and stateful load balancing is required.

BRIEF SUMMARY

Some embodiments of the invention provide a novel network architecture for advertising routes in an availability zone (e.g., a datacenter providing a set of hardware resources). The novel network architecture, in some embodiments, also provides a set of distributed services at the edge of a virtual private cloud (VPC) implemented in the availability zone (e.g., using the hardware resources of a datacenter). The novel network architecture includes a set of route servers for receiving advertisements of network addresses (e.g., internet protocol (IP) addresses) as being available in the availability zone (AZ) from different routers in the AZ. The route servers also advertise the received network addresses to other routers in the AZ. In some embodiments, the other routers include routers executing on host computers in the AZ, gateway devices (e.g., routers of the availability zone routers in the AZ, and routers that make up an intervening fabric between routers executing on the host computers, the route servers, and the gateway devices in the AZ.

The novel network architecture also includes multiple host computers that each execute a router (e.g., a routing instance) that (i) identifies network addresses available on the host computer, (ii) sends advertisements of the identified network addresses to the set of route servers, and (iii) receives advertisements from the set of route servers regarding network addresses available on other host computers. The identified network addresses, in some embodiments, include at least one of network addresses associated with data compute nodes (DCNs) (e.g., virtual machines (VMs), containers, pods, etc.) and network addresses associated with services available at the host computer. In some embodiments, the services are distributed edge services provided for data messages ingressing into, or egressing from, a VPC implemented in the AZ. The advertisements, in some embodiments, are made using a border gateway protocol (BGP) or other route advertising protocol.

The novel architecture also includes a set of controller computers that configure host computers to execute service instances to provide services for a virtual private cloud including DCNs executing on the host computers. In some embodiments, the service instances are for providing distributed services including distributed edge services provided for data messages ingressing into, or egressing from, a VPC implemented in the AZ. The distributed edge services, in some embodiments, is provided at a distributed logical router at a logical edge of the VPC (i.e., a logical router that processes data messages ingressing into, or egressing from, the VPC) as part of the logical router processing.

In some embodiments, a novel method for identifying network addresses available at a host computer are presented. A host computer executing a routing instance (e.g., a routing machine) detects that a network address has become available on the host computer. In some embodiments, detecting that the network address has become available includes detecting that at least one of a DCN or a service has been added to the host computer. The routing instance then identifies the network address that is associated with the detected DCN or service that has been added to the host computer. In some embodiments, the identified network address is an address to be used by other routers in the AZ. In other embodiments, the identified network address is an address that is used by routers and machines in networks external to the AZ. The routing instance then advertises the identified network addresses to at least one route server to be advertised to other routers in the AZ.

A host computer in the novel architecture, upon receiving a data message ingressing into the VPC and destined for a set of one or more DCNs in the VPC, performs a set of processing steps before delivering the data message to a destination DCN. In some embodiments, the host computer receives the data message at a managed forwarding element (MFE) (e.g., a software switch executing on the host computer). The MFE, in some embodiments, provides the received data message to the routing instance to determine a next hop. The next hop for data messages ingressing into the VPC, in some embodiments, is a tunnel endpoint (e.g., virtual extensible local area network VXLAN tunnel endpoint (VTEP)) that decapsulates a data message and provides the decapsulated data message to a distributed logical router processing operation. In some embodiments, the distributed logical router is defined at the logical edge of the VPC such that all traffic ingressing into, and egressing from, the VPC is processed through the distributed logical router.

The distributed logical router processing operation, in some embodiments, identifies a set of services (e.g., stateful or stateless edge services) that are required for processing the data message ingressing into the VPC. The set of services, in some embodiments, includes any or all of a firewall service, a network address translation (NAT) service, a load balancing service, a distributed intrusion detection system (IDS) service, and a distributed intrusion protection system (IPS) service. Different services use different information contained in the data message and, in some embodiments, are implemented in different ways based on the type of information used. For example, services using information contained within a header for layer 4 of the open systems interconnection (OSI) model (sometimes referred to as "L4 services") are executed in a kernel space because they do not consume a lot of resources and moving them into the user space would slow them down unacceptably. However, services using data at layer 7 of the OSI model (sometimes referred to as "L7 services"), in some embodiments, execute in a user space because of their resource-intensive processing that could occupy threads in a kernel space meant for quickly processing data messages and because the cost of moving into the user space is not as significant compared to the cost of performing the operation in the first place.

Sets of services, in some embodiments, are implemented for multiple tenants in separate VPCs on a same host computer. In some embodiments, the different services are provided by different modules (containers, applications, etc.) in a multi-tenant service machine (or pod). In some embodiments using a multi-tenant service machine, the service machine executes a separate VTEP to distinguish the traffic for each tenant. In other embodiments, each tenant is provided with a separate service machine (e.g., virtual machine, container, pod, etc.) to implement the set of L7 services for the tenant.

In some multi-tenant embodiments, the routing instance is a multi-tenant routing instance that maintains separate virtual routing and forwarding (VRF) contexts for each tenant. In some embodiments, the routing instance is a BGP instance. In some embodiments, the routing instance is a multi-protocol BGP instance (MP-BGP) that supports multiple addressing protocols (e.g., multi-protocol label switching (MPLS), BGP-labeled unicast (BGP-LU), segment routing (SR), etc.). The different VRF contexts, in some embodiments, are distinguished by route distinguishers and route targets are used to identify advertisements relevant to each VRF context. The routing instance, in some embodiments, include a free range routing daemon that implements the MP-BGP advertisement and route learning operations of the routing instance.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings, and the Claims is needed. Moreover, the claimed subject matters are not to be limited by the illustrative details in the Summary, Detailed Description, and the Drawing.

BRIEF DESCRIPTION OF THE DRAWINGS

The novel features of the invention are set forth in the appended claims. However, for purposes of explanation, several embodiments of the invention are set forth in the following figures.

FIG. 7 conceptually illustrates a process for detecting services that have been added to a host computer and advertising network addresses to other routers in the AZ.

FIG. 8 conceptually illustrates a similar process for detecting that a service has been removed from the host computer and withdrawing the network address associated with the removed service from other routers in the availability zone.

DETAILED DESCRIPTION

Figure 1:
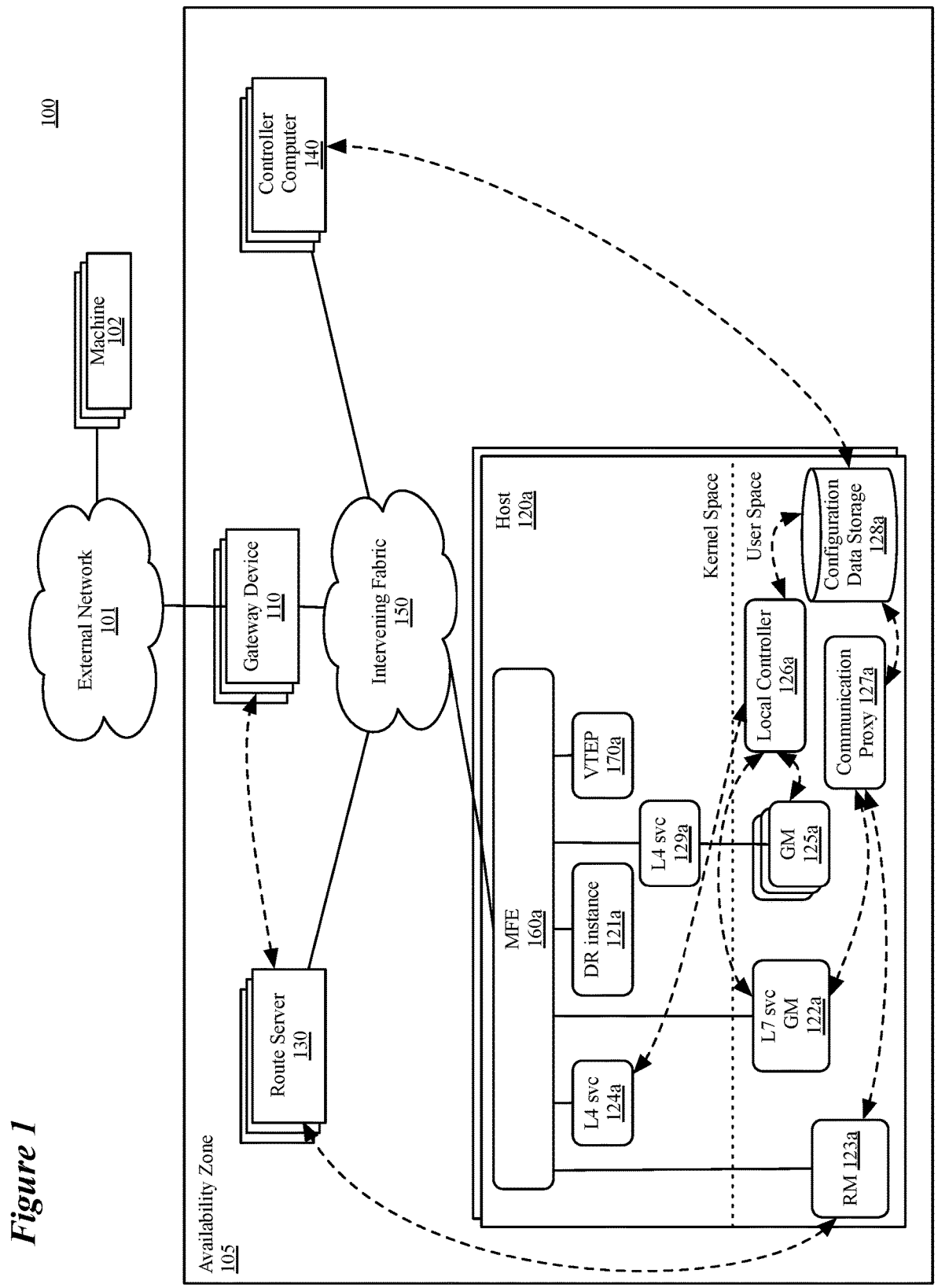
FIG. 1 illustrates an exemplary network in which the novel architecture is implemented.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel network architecture for advertising routes in an availability zone (e.g., a datacenter providing a set of hardware resources). The novel network architecture, in some embodiments, also provides a set of distributed services at the edge of a virtual private cloud (VPC) implemented in the availability zone (e.g., using the hardware resources of a datacenter). The novel network architecture includes a set of route servers (sometimes referred to as route reflectors) for receiving advertisements of network addresses as being available in the availability zone (AZ) from different routers in the AZ. The route servers also advertise the received network addresses to other routers in the AZ. In some embodiments, the other routers include routers executing on host computers in the AZ, gateway devices (e.g., routers of the availability zone routers in the AZ, and routers that make up an intervening fabric between routers executing on the host computers, the route servers, and the gateway devices in the AZ.

The novel network architecture also includes multiple host computers that each execute a router (e.g., a routing instance) that (i) identifies network addresses available on the host computer, (ii) sends advertisements of the identified network addresses to the set of route servers, and (iii) receives advertisements from the set of route servers regarding network addresses available on other host computers. The identified network addresses, in some embodiments, include at least one of network addresses associated with data compute nodes (DCNs) (e.g., virtual machines (VMs), containers, pods, etc.) and network addresses associated with services available at the host computer. In some embodiments, the services are distributed edge services provided for data messages ingressing into, or egressing from, a VPC implemented in the AZ. The advertisements, in some embodiments, are made using a border gateway protocol (BGP) or other route advertising protocol.

As used in this document, packet refers to a collection of bits in a particular format sent across a network. A packet, in some embodiments, is referred to as a data message. One of ordinary skill in the art will recognize that the terms packet and data message are used in this document to refer to various formatted collections of bits that are sent across a network. The formatting of these bits can be specified by standardized protocols or non-standardized protocols. Examples of packets following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

Also, in this example, the term managed forwarding element (MFE) refers to software forwarding elements or hardware forwarding elements that are configured by a controller computer cluster (i.e., a set of one or more controller computers that provide configuration data to network elements) to implement a virtual private cloud (VPC) (e.g., logical network comprising a set of logical forwarding elements (LFEs)). The VPC, in some embodiments, is implemented as a logical overlay network that uses tunneled packets to traverse the physical underlay network. In some embodiments, each LFE is a distributed forwarding element that spans multiple host computers and is implemented by configuring multiple MFEs on multiple host computers. To do this, each MFE or a module associated with the MFE (e.g., a VXLAN tunnel endpoint (VTEP)) in some embodiments is configured to encapsulate the data messages of the LFE with an overlay network header that contains a virtual network identifier (VNI) associated with the overlay network. As such, the LFEs are said to be overlay network constructs that span multiple host computers in the discussion below.

The LFEs also span, in some embodiments, configured hardware forwarding elements (e.g., top of rack switches). In some embodiments, the set of LFEs includes a logical switch that is implemented by configuring multiple software switches or related modules on multiple host computers. In other embodiments, the LFEs can be other types of forwarding elements (e.g., logical routers), or any combination of forwarding elements (e.g., logical switches and/or logical routers) that form VPCs (e.g., logical networks) or portions thereof. Many examples of LFEs, logical switches, logical routers and logical networks exist today, including those provided by VMware's NSX network and service virtualization platform.

The novel architecture also includes a set of controller computers that configure host computers to execute service instances to provide services for a virtual private cloud including DCNs executing on the host computers. In some embodiments, the service instances are for providing distributed services including distributed edge services provided for data messages ingressing into, or egressing from, a VPC implemented in the AZ. The distributed edge services, in some embodiments, is provided at a distributed logical router at a logical edge of the VPC (i.e., a logical router that processes data messages ingressing into, or egressing from, the VPC) as part of the logical router processing.

FIG. 1 illustrates an exemplary network 100 in which the novel architecture is implemented. FIG. 1 illustrates a network 100 comprising an external network 101 connecting a set of machines 102 outside of an availability zone 105 (e.g., a datacenter) with guest machines (GMs) 125 executing on a number of hosts 120 in the availability zone 105 (e.g., a public cloud datacenter or set of datacenters). The availability zone 105 includes a set of gateway devices 110 through which data messages into and out of the availability zones 105 pass. The availability zone 105 also includes a set of controller computers 140 of the VPC that provide configuration instructions to the hosts 120. In some embodiments, the controller computers 140 execute in a different availability zone and communicate with hosts 120 through a management plane (e.g., a management VPC) that spans multiple availability zones.

FIG. 1 also illustrates a set of route servers 130 that serve as a route learning (e.g., BGP) proxy for other routers in the AZ 105 and an intervening fabric 150 that connects the different elements illustrated in FIG. 1. Finally, FIG. 1 illustrates a set of host computers 120 that represent a set of physical resources of the AZ 105 on which at least one VPC is implemented. The host computers 120 are represented by host 120*a* that includes a managed forwarding element 160*a* that connects the components of the host computer 120*a* to each other and to the intervening fabric 150 to communicate with other host computers 120 and with external machines 102 in external network 101. In some embodiments, the MFE 160*a* is a software forwarding element executing in a hypervisor of host 120*a*.

The host computers 120 execute guest machines 125 (e.g., DCNs, containers, pods, etc.) which for the sake of simplicity are assumed to belong to a single tenant's VPC. The VPC implemented across the set of host computers 120 also includes a set of services that are provided to the GMs 125 executing on the set of hosts 120. The GMs 125, in some embodiments, are applications that service external requests (e.g., web server) or that support other GMs 125 (e.g., database server).

In the illustrated example a set of services for the GMs 125*a* include sets of L4 services 124*a* and 129*a*, and a guest machine providing a set of L7 services 122*a*. In some embodiments, the L4 services 124*a* and the L7 service GM 122*a* are connected to a service segment of the VPC while the L4 services 129*a* are inline L4 services for a destination GM in the set of GMs 125*a*. In some embodiments, the service segment is shared by multiple tenant VPCs that make use of the same L7 service GM 122*a*. Because the L7 service GM 122*a* is resource intensive, to execute a separate L7 service GM 122 for each tenant can unnecessarily consume resources.

The L4 services 124*a* and 129*a* are shown executing in a kernel space while the L7 services are shown executing in a L7 service GM 122*a* in a user space. In some embodiments, the inline L4 services 129a include services such as firewall and NAT services that are part of a processing pipeline for destination GMs in the set of GMs 125a. In some embodiments, the L4 services 129a are called from a port of a logical switching element or from a VNIC of GMs in the set of GMs 125a. For some services that are part of the processing pipeline for a particular destination GM (e.g., an L4 firewall), the service is not independently addressable by external machines and does not need to have any network address advertised by the routing machine 123a.

The L4 services 124a, in some embodiments, include at least one of L4 firewall and load balancing services and the L7 services provided in L7 service guest machine 122a include at least one of a load balancing service, a distributed intrusion detection system (IDS) service, and a distributed intrusion protection system (IPS) service. For some L4 and L7 services, such as an inline NAT service using a particular external IP address or a load balancing service (either L4 or L7 load balancing) for a set of compute nodes addressed using a particular virtual IP address (VIP), some embodiments advertise a network address associated with the service.

In some embodiments, a set of network addresses advertised for a particular service is not only the specific address used by the service but includes an additional network address that identifies a particular service instance (e.g., service executing on a particular host computer) in a set of service instances that provide a distributed service using a same network address. For example, a distributed NAT service that uses a particular IP version 4 (IPv4) address as an external address at multiple host computers can identify individual host computers providing the service by having each host computer advertise an IP version 6 (IPv6) address that uniquely identifies the host computer (or distributed NAT service instance executing on the host computer) within the AZ. Similarly, a distributed load balancing service can identify different hosts providing the service by having each host computer advertise an IPv6 address that uniquely identifies the host computer (or distributed load balancing service instance executing on the host computer) in the AZ. In some embodiments, the IPv6 addresses advertised for particular distributed service instances are based on the IPv4 addresses associated with the distributed services such that the gateway device, upon receiving a data message that is destined to an IPv4 address associated with a distributed service, can generate the IPv6 address that identifies the particular host that should receive the data message. Specific examples of the use of such IPv6 addresses are provided in U.S. patent application Ser. No. 16/931,196, filed on Jul. 16, 2020, now published as U.S. Patent Publication No. 2022/0021645, which is hereby incorporated by reference.

The host computers 120 also include components for interacting with the controller computer set 140. Host computer 120a includes a configuration data storage 128a that stores configuration data received from the set of controller computers 140. A local controller 126a uses the information stored in configuration data storage 128a to configure the GMs 125a, the routing machine 123a, and the services 124a and 122a. The information stored in the configuration data storage 128a, in some embodiments, includes L2 and L3 addresses associated with the GMs 125a, the routing machine 123a, and the services 124a and 122a, along with an identification of services associated with each GM 125a (e.g., policies defining when a service should process an incoming or outgoing data message). In other embodiments, the local controller also configures the MFE 160a, the distributed routing (DR) instance 121a, and the VXLAN tunnel endpoint (VTEP) 170a to implement the VPC.

Figure 2:
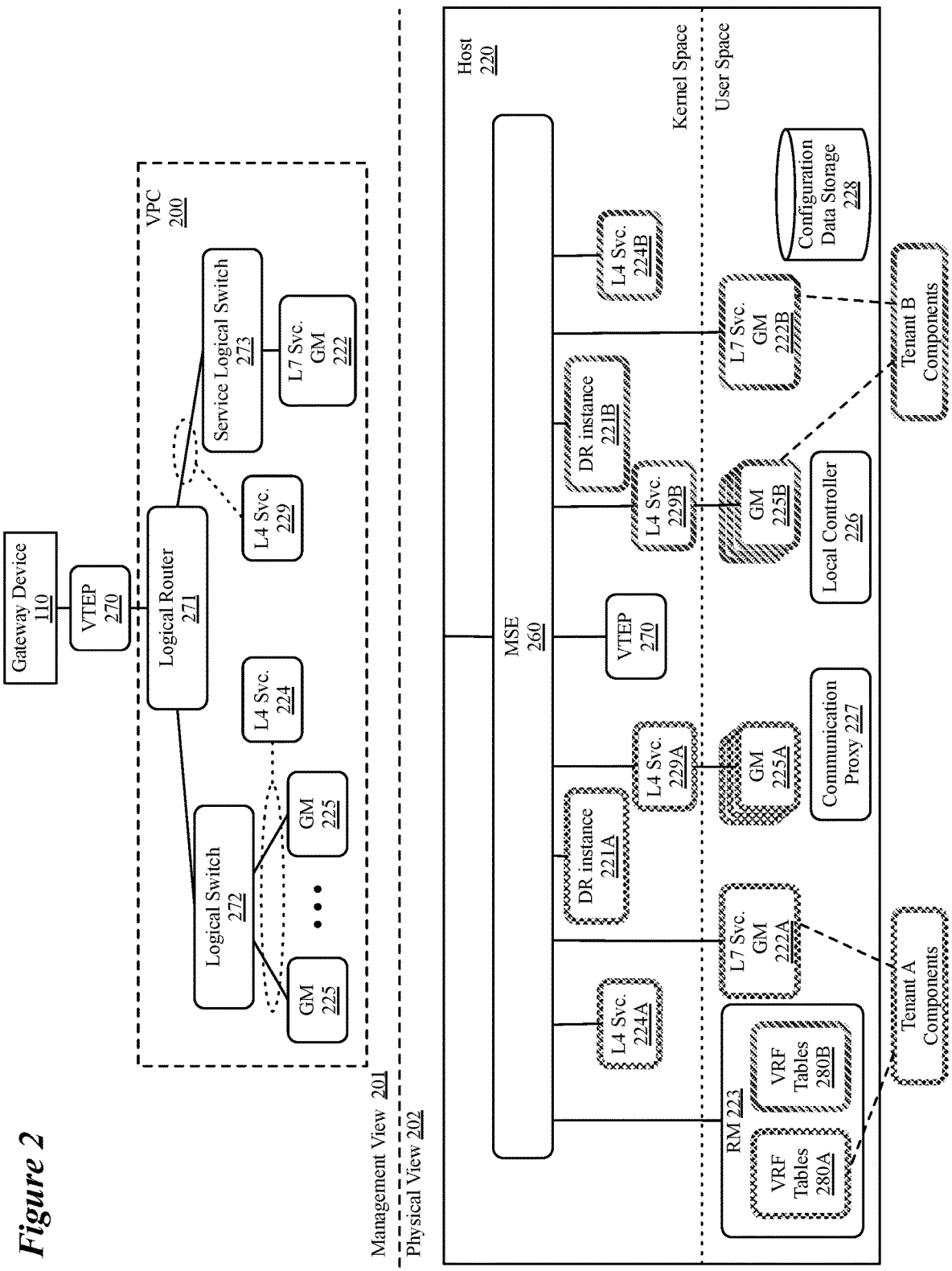
FIG. 2 illustrates an embodiment of a host computer within a network that executes components for two different VPCs.
Figure 3:
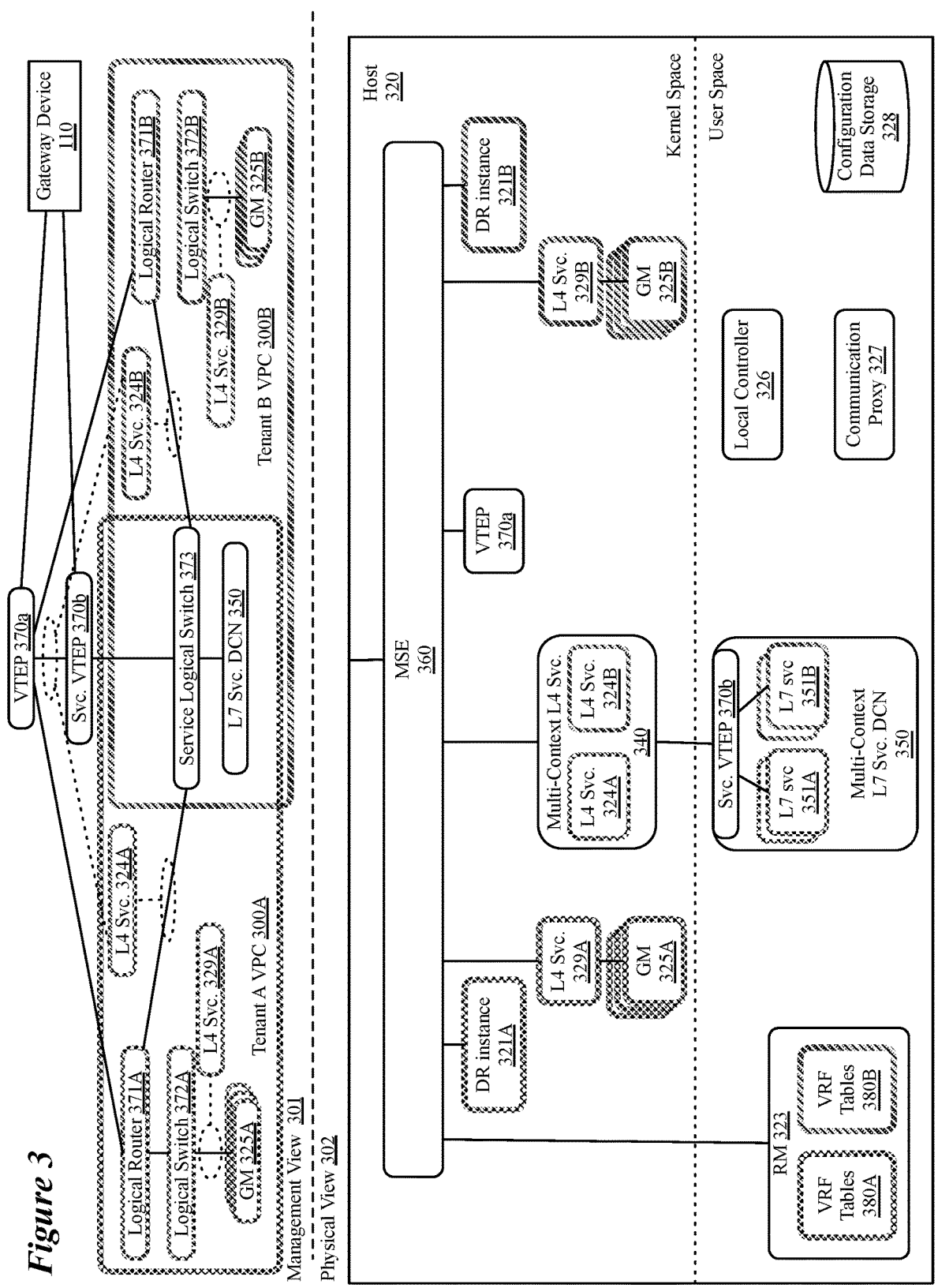
FIG. 3 illustrates a second embodiment of a host computer within a network that executes components of multiple VPCs.

FIG. 1 illustrates an embodiment in which a host computer executes components of a VPC for a single tenant. In alternative embodiments, components of two or more VPCs operated on behalf of one or more tenants execute in a single host computer. FIGS. 2 and 3 illustrate two possible embodiments executing components for multiple VPCs of one or more tenants. FIG. 2 illustrates a management view 201 (or logical view) of an exemplary logical network (VPC) that, in FIG. 2, is implemented for two VPCs (i.e., Tenant A and Tenant B) and a physical view 202 of a representative host computer 220 in a network such as network 100 of FIG. 1 that executes components of multiple VPCs. The two VPCs, in some embodiments, belong to two different tenants, while in other embodiments the two VPCs belong to a single tenant (e.g., VPCs for two different department of a same corporation).

The VPC (or logical network) 200 includes a logical router 271 that, in the depicted embodiment, is an edge (or gateway) logical router for the VPC. The VPC includes a first logical switch 272 that is used to connect a set of guest machines 225 (e.g., DCNs, VMs, containers, pods, etc.) to the logical router 271. The VPC further includes, in the depicted embodiment, a separate service logical switch 273 that connects the logical router 271 to an L7 service GM 222. As discussed above the L7 service GM 222, in some embodiments, executes multiple applications, programs, or containers to provide multiple different services for the VPC.

The logical view illustrates the set of inline services L4 services 224 being provided between the logical switch 272 and the GMs 225 and the set of inline L4 services 229 being provided between the logical router and the service logical switch. In some embodiments, these services are logically part of the processing pipeline of logical router 271 or logical switches 272 and 273 and are not logically distinct. In some embodiments, the L4 services 224 are logically applied at virtual interfaces attached to GMs 225 and include at least one of a distributed firewall service and a distributed network address translation service. In other embodiments, additional separate service nodes (e.g., third party service nodes) are called by the logical router 271 or logical switches 272 and 273. While the illustrated VPC includes only a single logical router and two logical switches, other VPCs in other embodiments include multiple tiers of logical routers and additional logical switches and different VPCs that both span a particular host computer will have different logical components or logical structures.

The physical view 202 illustrates similar components to FIG. 1 that are similarly numbered, but the components for VPCs for tenants A and B are distinguished by using "A" and "B" and different border shading. The routing machine 223, in the multi-tenant (or multi-VPC) embodiment depicted in FIG. 2 is a multi-tenant routing machine that maintains different virtual routing and forwarding (VRF) tables 280A and 280B for the tenants A and B, respectively. In some embodiments, the different VRF tables are associated with different route distinguishers and route targets used to facilitate packet forwarding using multi-protocol label switching (MPLS). Additionally, or alternatively, the different VRF tables 280 are, in some embodiments, associated with different virtual network identifiers (VNIs) used in implementing VXLAN encapsulation. The host computer 220 also executes a single VTEP 270 that serves as a tunnel endpoint for data messages for the multiple tenants.

The host computer 220, in the illustrated embodiment, executes separate guest machines 225A and 225B (DCNs, VMs, containers, pods, etc.), distributed router instances 221A and 221B, L4 services 224A, 224B, 229A, and 229B, and L7 service GMs 222A and 222B for each tenant (e.g., VPC). In FIG. 2, the managed switching element (MSE) 260 serves to connect the different components of each VPC. In some embodiments, the MSE 260 is configured to implement the logical switching elements (e.g., logical switch 272 and service logical switch 273) of each VPC. The logical switching elements, in some embodiments, span multiple host computers and are implemented by MSEs on each of the host computers in the span of the logical switching elements. Similarly, the logical router 271 of each VPC spans multiple hosts and is implemented by the distributed router instance 221 for the VPC on each host. In some embodiments, the various elements of host computer 220 are configured based on configuration data stored in the configuration data storage 228 that are received from a controller computer cluster that generates configuration data for implementing a set of VPCs across multiple host computers including host computer 220.

In addition to the separate VPC components, the host computer 220 also executes components that are used, in some embodiments, by all tenants. For example, routing machine 223, VTEP 270, managed switching element (MSE) 260, local controller 226, communication proxy 227, and configuration data storage 228, in some embodiments are used by all tenants in common. In some embodiments in which a single VTEP 270 executes on the host computer, the gateway device 110 establishes a tunnel to VTEP 270 to forward packets to L7 services 222A and 222B and GMs 225A and 225B.

FIG. 3 illustrates a management view 301 (or logical view) of exemplary logical networks (VPC) 300A and 300B and a physical view 302 of a representative host computer 320 in a network such as network 100 of FIG. 1 that executes components of multiple VPCs. The host computer 320 of FIG. 3 implements VPCs with similar logical structures as the exemplary logical network (VPC) of FIG. 2 but instead of the service logical switch (1) being logically separate for each VPC and (2) being reached exclusively through the logical router, the service logical switch (1) is a logical switch reachable by both VPCs 300A and 300B and (2) service VTEP 370b is used to forward ingressing data messages addressed to the L7 services directly to the service logical switch 373. In some embodiments using a first VTEP 370a for traffic to GMs 325A and 325B and a second VTEP 370b for traffic to L7 services in multi-context L7 service DNC 350, gateway devices of the AZ establish separate tunnels to each VTEP of the host computers, a first tunnel used to forward traffic to GMs and a second tunnel used to forward traffic to externally addressable L7 service instances in the multi-context L7 service DCN 350. Packets sent from the L7 services to other GMs in a VPC, in some embodiments, are forwarded to distributed routers using the overlay network through a tunnel between the VTEPs 370b and 370a. As for FIG. 2, the two VPCs, in some embodiments, belong to two different tenants, while in other embodiments the two VPCs belong to a single tenant (e.g., VPCs for two different department of a same corporation).

The service logical switch (e.g., service plane), in some embodiments, is a separate logical switch or other construct that allows logical forwarding elements (e.g., logical routers, logical switches, etc.) of each VPC to access the L7 services (e.g. L7 firewall, load balancing, intrusion detection, etc.). In some embodiments, the L7 services are reached by encapsulating a data message in a header that identifies the logical service switch (or other construct) and the source context (e.g., VPC, logical forwarding element, tenant, etc.) to reach the proper L7 service instance 351 and be returned to the proper VPC or logical forwarding element. The L7 services, in some embodiments, are called as part of a processing pipeline for a logical forwarding element and are returned to the logical forwarding element to complete the logical processing pipeline. In some embodiments, calling the L7 service as a part of a processing pipeline includes intercepting traffic requiring the L7 service, encapsulating the traffic (e.g., using generic network virtualization encapsulation (GENEVE)) for delivery to the L7 service with information identifying the logical context of the original traffic (e.g., a tenant ID, VNI of a logical forwarding element, etc.) to enable the L7 service to provide the service defined for the logical context and return the traffic to the correct logical switch or processing pipeline.

In other embodiments, instead of providing a logical switch (e.g., service plane) to which each VPC connects, the L7 service DCN 350 has a connection to each logical switch for which it provides L7 services. However, because the (re)direction of traffic to the L7 service is performed in the kernel space, other constructs are used in yet other embodiments as will be appreciated by one of ordinary skill in the art.

FIG. 3 illustrates an embodiment in which the L4 services 324A and 324B associated with a service logical switch 373 execute as a multi-context L4 service 340 that provides L4 services for different tenants based on tenant or logical network identifiers included in the packet (e.g., a VNI included in a VXLAN header). Additionally, sets of L7 services 351A and 351B for tenants A and B, respectively, execute within a single multi-context L7 service DCN 350. In order to facilitate the provision of L7 services for different VPCs within a same L7 service DCN 350, the illustrated embodiment also implements the service VTEP 370b within the L7 service DCN 350 to distinguish between traffic for the different tenants or VPCs. In some embodiments, the multi-context L7 service DCN 350 is one of a virtual machine or pod that include multiple L7 service containers or execute multiple L7 service applications for different tenants. Other elements that appear in FIG. 3 and share similar numbering with FIGS. 1 and 2 also share similar functions and features.

Figure 4:
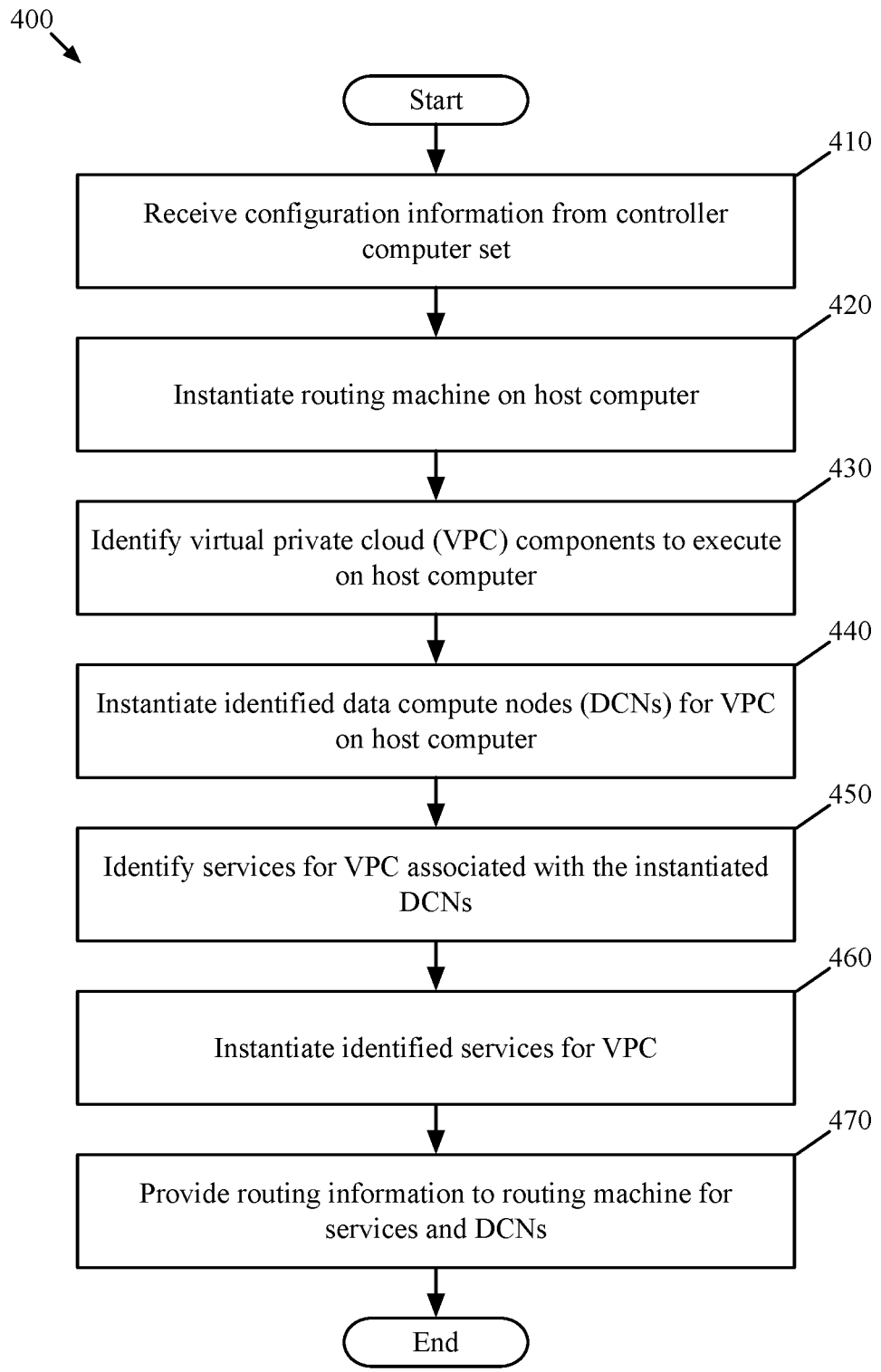
FIG. 4 conceptually illustrates a process for configuring components of a host computer to implement a virtual private cloud inside an availability zone.

FIG. 4 conceptually illustrates a process 400 for configuring components of a host computer (e.g., host computer 120) to implement a VPC inside an AZ. The process 400, in some embodiments, is performed by a hypervisor of a host computer based on configuration information received from a controller computer (e.g., controller computer set 140). In some embodiments, process 400 is an initialization process performed when a host computer is first configured to implement a VPC. Process 400 begins by receiving (at 410) configuration information from a controller computer set. The configuration information, in some embodiments, includes configuration for a set of components for implementing a VPC in concert with other host computers in an AZ (and possibly other AZs). The components for implementing the VPC, in some embodiments, comprise a routing machine that is used for advertising the network addresses associated with the VPC to other routers in the AZ and receiving advertisements from other routers in the AZ. The components for implementing the VPC, in some embodiments, include data compute nodes (DCNs) of the VPC and service instances for services provided within the VPC for the DCNs of the VPC.

Based on the received configuration information, the process 400 instantiates (at 420) the routing machine on the host computer. As used in this document, the term instantiate is used to mean a process that causes a network component (e.g., DCN, service, logical network element, etc.) to be added to, or made available on, a host computer. In some embodiments, the routing machine is instantiated on each host computer as it is first configured for implementing VPCs and the single routing machine is then used by each VPC subsequently implemented on the host computer. Accordingly, the routing machine is a multi-tenant (or multi-tenant capable) routing machine and is configured to use at least one standard routing advertisement protocol (e.g., MP-BGP) to advertise routes for VPC components of different tenants. The routing machine, in some embodiments, is one of a standard virtual machine, a lightweight virtual machine, a container, or a pod.

Either before or after instantiating (at 420) the routing machine on the host computer, the process identifies (at 430) a set of VPC components to execute on the host computer. The identified components, in some embodiments, include a set of DCNs of the VPC, a set of logical forwarding elements (LFEs) of the VPC, and a service compute node (e.g., a virtual machine, container, or pod). In some embodiments, the configuration information also includes information regarding the connections between the DCNs, service compute node, and LFEs. In some embodiments in which instantiating the routing machine occurs after identifying (at 430) the set of VPC components, identifying the set of VPC components includes identifying the routing machine as needing to be instantiated.

After identifying (at 430) the components of the VPC to execute on the host computer, the process 400 instantiates (at 440) the identified DCNs for the VPC. The identified DCNs, in some embodiments, include DCNs for the VPC that are associated with providing a particular service for machines in an external network. The DCNs associated with providing a particular service for machines in an external network, in some embodiments, include at least one of DCNs that are directly addressable from external machines and DCNs that are addressable at a network address (e.g., a VIP) associated with a set of DCNs for providing the particular service executing on a set of host computers in one or more AZs. Other identified DCNs, in some embodiments, include DCNs for providing services to other DCNs in the VPC that are addressable within a private address space of the VPC.

In addition to identifying (at 430) the components of the VPC, the process 400 identifies (at 450) a set of services associated with the identified VPC components. The services, in some embodiments, are identified based on policies of the VPC that define sets of services associated with DCNs in the VPC. In some embodiments, the identified services include different types of services such as a firewall service, a NAT service, a load balancing service, an IDS service, and an IPS service. In some embodiments, not all services associated with the VPC are required for a set of DCNs executing on a particular host computer and the identified set of services is the subset of services associated with the specific DCNs executing on the host computer. In some embodiments, a same service (e.g., a firewall service) is called from multiple ports of a single logical switching element or even from ports of multiple logical switching elements of the VPC.

Once the services associated with the DCNs are identified (at 450), the process instantiates (at 460) the identified services. In some embodiments, the identified services include services that are instantiated in different ways. For example, services that are provided as inline services (e.g., provided as part of a processing pipeline) are added as components (e.g., programs or function calls) that can be called from ports of multiple logical switching elements. For example, L4 services 129a of FIG. 1 represent a set of inline services that may be implemented using function calls. In some embodiments, the identified services include services that are provided based on information at layers 1-4, but not higher layers, of the OSI model (e.g., L4 services 124a and 129a) that are instantiated to execute in a kernel space of the host computer.

Other identified services included services that are provided based on information at layer 7 of the OSI model (e.g., L7 services) and that are instantiated to execute in a user space of the host computer. In some embodiments, the L7 services run in one of a virtual machine, a lightweight virtual machine, a container, or a pod in a user space of the host computer. In some embodiments, multiple L7 services execute in a same virtual machine (e.g., as separate applications within a VM) or pod (e.g., as separate containers within a pod). Other identified services that are resource intensive, in some embodiments, are also configured to execute in the user space of the host computer along with the identified L7 services. In some embodiments, a virtual machine or container in which L7 services execute are not instantiated (or added) until a service requiring the VM or container is identified. Running only services and VMs or containers identified as necessary, in some embodiments, saves host computer resources for DCNs and services executing on the host computer. In some embodiments, a local controller (e.g., local controller 126) is responsible for instantiating and configuring the DCNs, services, LFEs, and service VMs (or containers/pods) based on configuration data stored in local storage (e.g., configuration data storage 128). In some embodiments, services executing within a VM or container (or an nginx datapath associated with the VM or container) are configured using a virtual machine communication interface (VMCI) proxy (e.g., communication proxy 127) that provides configuration information from the local storage.

After (or in conjunction with) instantiating (at 440 and 460) the identified VPC components, the process 400 provides (at 470) routing information for the instantiated components of the VPC and the services to the routing instance on the host computer. In some embodiments, providing the routing information comprises having the instantiated components announce their network addresses to the routing machine (e.g., using a gratuitous address resolution protocol (GARP) data message). In other embodiments, providing the routing information to the routing machine additionally, or alternatively, includes providing the routing information from the local storage through a VMCI proxy (e.g., communication proxy 127) that retrieves configuration information from the local storage and provides it to the routing machine. The routing instance, in some embodiments, registers with the local configuration data storage (through a VMCI proxy) or with a VMCI proxy to receive updates to configuration information related to DCNs and services operating on the host computer.

In some embodiments, a novel method for identifying network addresses available at a host computer are presented. A host computer executing a routing instance (e.g., a routing machine) detects that a network address has become available on the host computer. In some embodiments, detecting that the network address has become available includes detecting that at least one of a DCN or a service has been added to the host computer. The routing instance then identifies the network address that is associated with the detected DCN or service that has been added to the host computer. In some embodiments, the identified network address is an address to be used by other routers in the AZ. In other embodiments, the identified network address is an address that is used by routers and machines in networks external to the AZ. The routing instance then advertises the identified network addresses to at least one route server to be advertised to other routers in the AZ.

Figures 5, 6:
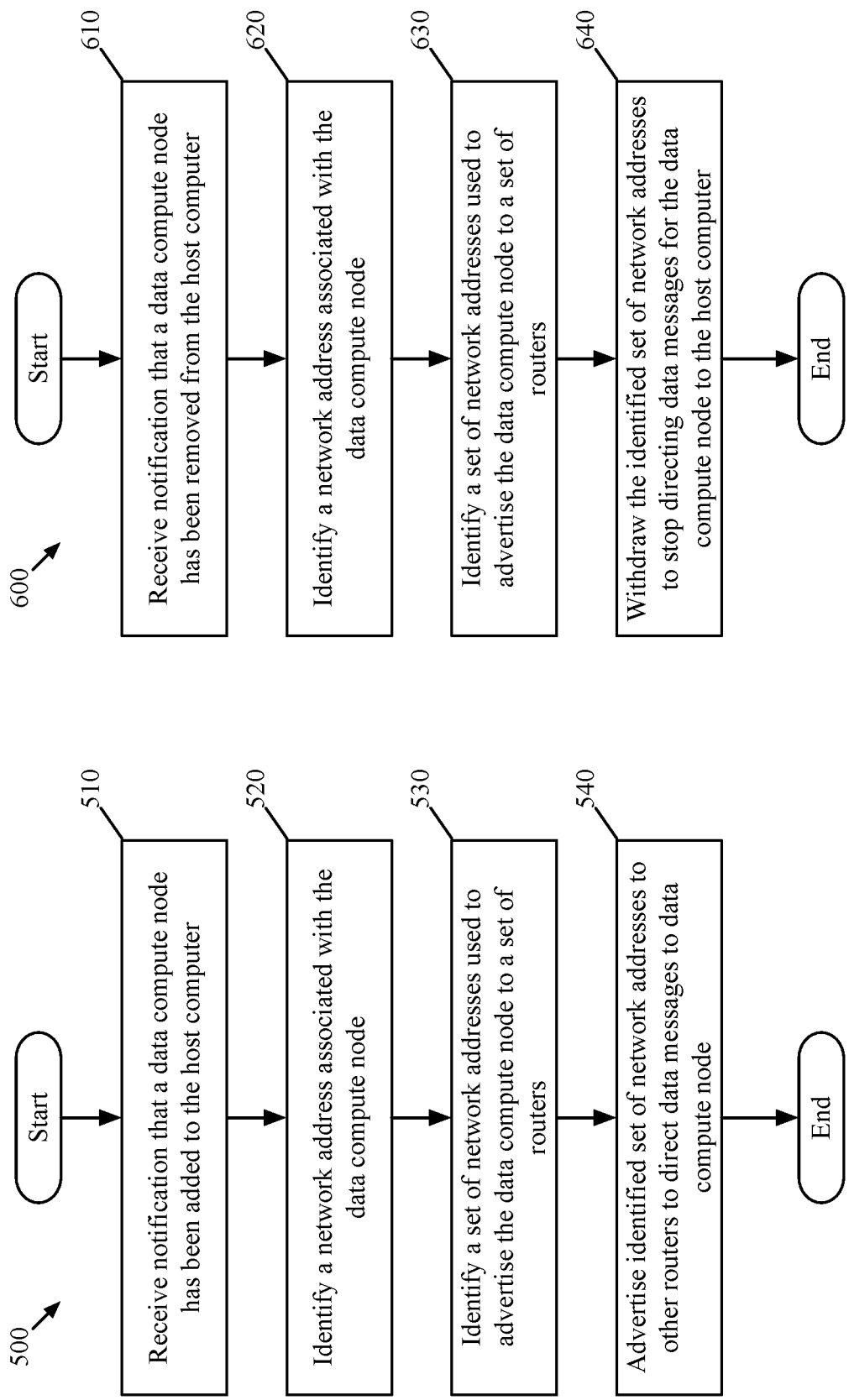
FIG. 5 conceptually illustrates a process for detecting that a data compute node has been added to a host computer and advertising the network address associated with the data compute node to other routers in the availability zone.
FIG. 6 conceptually illustrates a process for detecting that a DCN has been removed from the host computer.

FIG. 5 conceptually illustrates a process 500 for detecting that a DCN has been added to a host computer and advertising the network address associated with the DCN to other routers in the AZ. The process 500, in some embodiments, is performed by a routing machine (or free range routing daemon of the routing machine) on a host computer that is in communication with a set of route servers using a route learning protocol (e.g., BGP, MP-BGP, IS-IS, etc.). In some embodiments, the routing machine registers for receiving notifications when DCNs are added to, or removed from, a host computer on which the routing machine executes. In some embodiments, the registration (e.g., through an API call) is with a local controller or VMCI proxy executing on the host computer that retrieve configuration data regarding DCNs on the host computer from a local configuration data storage.

The process 500 begins, in some embodiments, by receiving (at 510) a notification that a DCN has been added to the host computer. In some embodiments, the notification comprises a set of information about the added DCN that is used to generate routing entries in the routing machine. Additionally, the set of information, in some embodiments, is used to generate an advertisement to other routers in the AZ as described below. One of ordinary skill in the art will appreciated that, in some embodiments, no registration is required and the information received in operation 510 is received from a DCN upon being added to the host computer (e.g., through a gratuitous address resolution proxy (GARP) message).

After receiving (at 510) the set of information about the added DCN, a network address associated with the DCN is identified (at 520). In some embodiments, identifying the network address includes identifying the information in the received set of information relating to the network address of the DCN. In some embodiments, the set of information includes the network address of the DCN within the VPC for which it is added, a VPC identifier (e.g., a virtual network identifier (VNI)), and a next hop towards the added DCN. Once the network address is identified (at 520), the routing machine identifies (at 530) a set of network addresses used to advertise the added DCN. In some embodiments, the identified set of network addresses used to advertise the DCN to other routers in the AZ includes a first network address for advertising the availability of the DCN to other components of the VPC and a second network address that is used by machines outside the VPC. The second network address, in some embodiments, is a network address that the DCN uses to make itself available to external machines. In some embodiments, the second network address is a network address that is associated with a service that is added to the host computer to service the added DCN.

The identified set of network addresses, in some embodiments, is a single network address (e.g., a /32 IP address that specifies all 32 bits of an IP address) that is associated with additional information that is used to identify the availability of the DCN to other components of the VPC and to machines outside of the VPC. The additional information (e.g., contextual information), in some embodiments, includes at least one of a virtual network identifier (VNI) or logical network identifier (LNI) associated with the VPC associated with the DCN, a tenant identifier (TID) associated with the VPC, and a route distinguisher value that is used by other routers (1) to identify the advertised route as being relevant to a particular VRF context and (2) to distinguish routes for the added DCN from routes for other DCNs that have a same network address in a different VPC (e.g., DCNs sharing an IP address in a private IP address space used by multiple VPCs). In some embodiments, the identified network address further includes information identifying the host computer on which the DCN executes such as a VTEP network address or an IP address of the host computer. In some embodiments, contextual information is generated by the host computer on which a newly added DCN executes based on information stored at the host computer (e.g., configuration information stored in a configuration data storage).

In some embodiments, additional information is sent along with an identified network address to the route server, as further described below. This additional information in some embodiments includes contextual attributes associated with a machine to which the identified network address belongs. Examples of contextual attributes in some embodiments can include any attribute that is not an L2, L3, or L4 header value. For instance, in some embodiments, the contextual attribute that is sent along with the identified network address to the route reflector is the logical port identifier. A logical port identifier, in some embodiments, is used to resolve forwarding and service policies (e.g., a security policy specified using logical port groups to which a logical port identifier is added). A logical port identifier is identified, in some embodiments, for DCNs that have newly added IP addresses (e.g., for newly added DCNs or a new IP address added for an existing DCN). In some embodiments, the contextual attributes are included in a GENEVE header of an advertisement.

Once the set of addresses to be advertised has been identified (at 530), the identified set of network addresses is advertised (at 540) to other routers in the AZ in order to allow data messages to be directed to the DCN and the process ends. In some embodiments, advertising the set of network addresses to the other routers is done by advertising the set of network addresses to at least one route server in a set of route servers used to propagate routing information within the AZ. Advertising the set of network addresses to the set of route servers (route reflectors), in some embodiments, includes sending the additional information (e.g., the contextual information) to the route server along with the advertised set of network addresses. The additional information, in some embodiments, is included in a GENEVE (or other encapsulation) header of the advertisement of the identified set of network addresses.

In some embodiments, the set of route servers receive and send advertisements using standard protocols for communicating routes between routers such as BGP, or MP-BGP, IS-IS, IBGP, eBGP, OSPF, etc. and these standard protocols are used in place of a controller computer cluster updating routing information for each host computer as DCNs or services are added or removed from the VPC or migrated from one host computer to another within the VPC. In some such embodiments, mature protocols such as BGP are used to improve convergence speeds and reduce the workload for the controller computers. Additionally, the use of the route servers to communicate with the routers in the AZ reduces the amount of data required to update the routers within the AZ when compared with a full mesh architecture between all the routers in the AZ.

FIG. 6 conceptually illustrates a similar process 600 for detecting that a DCN has been removed from the host computer and withdrawing the network address associated with the removed data compute node from other routers in the availability zone. The process 600, in some embodiments, is performed by the same routing machine that performs process 500. As described above, in some embodiments, the routing machine registers for receiving notifications when DCNs are removed from a host computer on which the routing machine executes. In some embodiments, the registration (e.g., through an API call) is with a local controller or VMCI proxy executing on the host computer that retrieve configuration data regarding DCNs on the host computer from a local configuration data storage.

The process 600 begins, in some embodiments, by receiving (at 610) a notification that a DCN has been, or will be, removed from the host computer. Removing a DCN includes migrating the DCN to a different host and shutting down the DCN (e.g., removing the DCN from the VPC). In some embodiments, the notification comprises the set of information about the removed DCN that was used to generate routing entries in the routing machine. In some embodiments, the notification includes only a unique identifier of the removed DCN (e.g., a universally unique identifier (UUID)) that is used by the routing machine to identify the routing entries and advertisements that were made when the DCN was added to the host computer. Additionally, the set of information, in some embodiments, is used to generate an advertisement to other routers in the AZ to withdraw the route. One of ordinary skill in the art will appreciated that, in some embodiments, no registration is required and the information received in operation 610 is received from a local controller or VMCI proxy as part of a process for removing the DCN from the host computer.

After receiving (at 610) the set of information about the removed DCN, a network address associated with the DCN is identified (at 620). In some embodiments, identifying the network address includes identifying the information in the received set of information relating to the network address of the DCN. If the notification includes the unique identifier of the removed DCN, identifying the network address associated with the removed DCN includes using the unique identifier to identify the network address. In some embodiments, the set of information includes the network address of the DCN within the VPC associated with the removed DCN and a VPC identifier (e.g., a VNI). Once the network address is identified (at 620), the routing machine identifies (at 630) a set of network addresses used to advertise the DCN when it was added to the host machine. In some embodiments, the identified set of network addresses used to advertise the DCN to other routers in the AZ includes a first network address for advertising the availability of the DCN to other components of the VPC and a second network address that is used by machines outside the VPC. The identified set of network addresses, in some embodiments, is a single network address that is associated with additional information that is used to identify the availability of the DCN to other components of the VPC and to machines outside of the VPC. The additional information in some embodiments includes at least one of a VNI associated with the VPC associated with the DCN, a route distinguisher value that is used by other routers to identify the advertised route as being relevant to a particular VRF context and to distinguish routes for the added DCN from routes for other DCNs that have a same network address in a different VPC (e.g., DCNs sharing an IP address in a private IP address space used by multiple VPCs). In some embodiments, the identified network address further includes information identifying the host computer on which the DCN executes such as a VTEP network address or an IP address of the host computer.

Once the set of addresses that was has been identified (at 630), the identified set of network addresses is withdrawn (at 640) from other routers in the AZ in order to stop data messages from being directed to the DCN at the host computer and the process ends. In some embodiments, withdrawing the set of network addresses to the other routers is done by withdrawing the set of network addresses from at least one route server in a set of route servers used to propagate routing information within the AZ.

In addition to detecting the addition of DCNs to the host computer, the routing machine, in some embodiments, detects the addition of services to the host computer. FIG. 7 conceptually illustrates a process 700 for detecting services that have been added to a host computer and advertising network addresses to other routers in the AZ. In some embodiments, process 700 is performed not only when a service is added to a host computer, but is also performed upon updating the configuration of a service (e.g., updating allocated network addresses or port ranges). Process 700, in some embodiments, is performed by a routing machine on a host computer that is in communication with a set of route servers using a route learning protocol (e.g., BGP, MP-BGP, IS-IS, etc.). In some embodiments, the routing machine registers for receiving notifications when services are added to, or removed from, a host computer on which the routing machine executes. In some embodiments, the registration (e.g., through an API call) is with a local controller or VMCI proxy executing on the host computer that retrieve configuration data regarding services on the host computer from a local configuration data storage.

The process 700 begins, in some embodiments, by receiving (at 710) a notification that a service has been, or will be, added to the host computer. The added service, in some embodiments, is added as a service instance for a distributed service that is provided at multiple host computers using a same network address (or set of network addresses). In some embodiments, the notification comprises a set of information about the added service (or service instance) that is used to generate routing entries in the routing machine. Additionally, the set of information, in some embodiments, is used to generate an advertisement to other routers in the AZ as described below. One of ordinary skill in the art will appreciated that instead of registering for notifications, in some embodiments, the local controller is configured to provide information related to services added to a host computer to the routing machine. Alternatively, information regarding the service is received from a service instance upon being added to the host computer (e.g., through a gratuitous address resolution proxy (GARP) message).

After receiving (at 710) the set of information about the added service, a network address associated with the service is identified (at 720). In some embodiments, identifying the network address includes identifying the information in the received set of information relating to the network address associated with the service (e.g., an external IPv4 address associated with a NAT service or a virtual IPv4 address associated with a load balancing service). In some embodiments, the set of information includes a VPC identifier (e.g., a VNI), a set of ports allocated to the service instance on the host computer (e.g., for a distributed NAT service), and a next hop towards the added service. Once the network address is identified (at 720), the routing machine identifies (at 730) a set of network addresses used to advertise the added service. In some embodiments, the identified set of network addresses used to advertise the service to other routers in the AZ includes a first network address for advertising the availability of the service to other components of the VPC and a second network address that is used by machines outside the VPC. The identified set of network addresses used to advertise the added service, in some embodiments, is based on the network address in the received network address and on the additional information. For example, a network address advertised by a particular host computer for a distributed NAT service (e.g., a distributed stateful service) executing on multiple host computers, in some embodiments, is an IPv6 network address prefix that incorporates the IPv4 address associated with the NAT service and a set of ports allocated to the distributed NAT service instance executing on the particular host computer. The generation of the IPv6 network address is used to identify a service instance executing on a specific host computer that stores state information for a flow to avoid redirection within the AZ and is further described in U.S. patent application Ser. No. 16/931,196 filed on Jul. 16, 2020 which is hereby incorporated by reference.

For other services the identified set of network addresses, in some embodiments, is a single network address (i.e., a VIP associated with the service) that is associated with additional information that is used to identify the availability of the service to other components of the VPC and to machines outside of the VPC. The additional information in some embodiments includes at least one of a VNI associated with the VPC associated with the DCN, a route distinguisher value that is used by other routers to identify the advertised route as being relevant to a particular VRF context and to distinguish routes for the added DCN from routes for other DCNs that have a same network address in a different VPC (e.g., DCNs sharing an IP address in a private IP address space used by multiple VPCs). In some embodiments, the identified network address further includes information identifying the host computer on which the service executes such as a VTEP network address or an IP address of the host computer.

In some embodiments, even some stateful distributed services are advertised as being available at each host computer using a same network address. For example, a stateful distributed load balancing service for distributing requests received from clients in external networks, in some embodiments, relies on a set of gateways of the AZ to consistently send a same flow to a same host computer providing the distributed load balancing based on an equal cost multipathing (ECMP) operation performed at the gateway devices of the AZ across the host computers providing the distributed load balancing service. To enable this ECMP operation, in some embodiments, the routing machine on each host executing a distributed load balancer instance advertises the same VIP address as being available and the gateway devices of the AZ record the multiple advertised next hop addresses as being associated with the VIP as possible next hops. For received data messages addressed to the VIP, a gateway device of the AZ selects a particular next hop using an ECMP operation. In such embodiments, an acceptable number of redirection operations may be required upon a change in the number of host computers providing the distributed load balancing service such that it is not worth the effort to ensure that different host computers can be deterministically identified for each flow (or data message).

In embodiments relying on the ECMP of the AZ gateway devices to load balance for stateful edge services provided on a set of host computers of the AZ, upon a change in the routing table of the AZ gateways (e.g., based on a change in the number of host computers providing the distributed edge service) the ECMP operation is likely to direct data messages of at least some data message flows to different host computers than the data messages received before the change to the routing tables. In order to redirect these data messages to the host computer that maintains state information for the associated data message flows, some embodiments provide a redirection operation. In some embodiments, the host computers are aware of the algorithm or hash used by the ECMP operation of the AZ gateways and, when receiving a data message of an established data message flow for which a host computer does not store state information, the host computer performs the ECMP operation based on the previous set of host computers to determine the host computer storing state information and redirect the data message to that host computer.

In other embodiments in which the algorithm or hash of the AZ gateway ECMP operation is unknown, each new data message flow received at a particular host computer triggers a notification sent to each other host computer providing the edge service that the particular host computer maintains state information for that data message flow. Alternatively, the notification sent by the particular host computer is sent, in some embodiments, to a host computer that is selected using an operation (e.g., a consistent hash) that is known to each host computer. After a membership change (i.e., a change in the number or identities of host computers providing the edge service), the known operation is used to redirect the data message to the host computer selected using the known operation based on the previous membership. The selected host computer will then redirect the data message to the particular host computer maintaining the state information based on the notification sent from the particular host computer.

Once the set of addresses to be advertised has been identified (at 730), the identified set of network addresses for advertising the availability of the service is advertised (at 740) to other routers in the AZ in order to allow data messages to be directed to the service and the process ends. In some embodiments, advertising the set of network addresses to the other routers is done by advertising the set of network addresses to at least one route server in a set of route servers used to propagate routing information within the AZ. For services available to machines in networks outside of the AZ, the set of route servers advertises the network addresses to a set of gateway devices of the AZ that provide access to the external network.

In some embodiments, the set of route servers receive and send advertisements using standard protocols such as BGP, or MP-BGP, etc. and these standard protocols are used in place of a controller computer cluster updating routing information for each host computer as DCNs or services are added or removed from the VPC or migrated from one host computer to another within the VPC. In some such embodiments, mature protocols such as BGP are used to improve convergence speeds and reduce the workload for the controller computers. Additionally, the use of the route servers to communicate with the routers in the AZ reduces the amount of data required to update the routers within the AZ when compared with a full mesh architecture between all the routers in the AZ.

FIG. 8 conceptually illustrates a similar process 800 for detecting that a service has been removed from the host computer and withdrawing the network address associated with the removed service from other routers in the availability zone (and external networks). The process 800, in some embodiments, is performed by the same routing machine that performs process 700. As described above, in some embodiments, the routing machine registers for receiving notifications when services are removed from a host computer on which the routing machine executes. In some embodiments, the registration (e.g., through an API call) is with a local controller or VMCI proxy executing on the host computer that retrieve configuration data regarding services on the host computer from a local configuration data storage.

The process 800 begins, in some embodiments, by receiving (at 810) a notification that a service has been, or will be, removed from the host computer. Removing a service, in some embodiments, occurs when DCNs for a VPC including the service no longer execute on the host computer, when the DCNs executing on the computer do not require the service, or a service instance for a particular service is removed from a host computer (either migrated to another host or shut down to scale back the service capacity). In some embodiments, the notification comprises the set of information about the removed service that was used to generate routing entries in the routing machine. In some embodiments, the notification includes information that can be used by the routing machine to identify the routing entries and advertisements that were made when the service was added to the host computer. Additionally, the set of information, in some embodiments, is used to generate an advertisement to other routers in the AZ to withdraw the route (set of network addresses). One of ordinary skill in the art will appreciated that, in some embodiments, no registration is required and the information received in operation 810 is received from a local controller or VMCI proxy as part of a process for removing the service from the host computer.

After receiving (at 810) the set of information about the removed service, a network address associated with the service is identified (at 820). In some embodiments, identifying the network address includes identifying the information in the received set of information relating to the network address associated with the service. If the notification includes identifying information of the removed service, identifying the network address associated with the removed service includes using the identifying information to identify the network address. In some embodiments, the set of information includes a VPC identifier (e.g., a VNI), a set of ports allocated to the service instance on the host computer (e.g., for a distributed NAT service), and a next hop towards the added service. Once the network address is identified (at 820), the routing machine identifies (at 830) a set of network addresses used to advertise the service when it was added to the host machine. In some embodiments, the identified network address further includes information identifying the host computer on which the service executes such as a VTEP network address or an IP address of the host computer.

Once the set of addresses that was used to advertise the service has been identified (at 830), the identified set of network addresses is withdrawn (at 840) from other routers in the AZ in order to stop data messages from being directed to the DCN at the host computer and the process ends. In some embodiments, withdrawing the set of network addresses to the other routers is done by withdrawing the set of network addresses from at least one route server in a set of route servers used to propagate routing information within the AZ.

In some embodiments, the set of route servers receive and send advertisements using standard protocols such as BGP, or MP-BGP, etc. and these standard protocols are used in place of a controller computer cluster updating routing information for each host computer as DCNs or services are added or removed from the VPC or migrated from one host computer to another within the VPC. In some such embodiments, mature protocols such as BGP are used to improve convergence speeds and reduce the workload for the controller computers. Additionally, the use of the route servers to communicate with the routers in the AZ reduces the amount of data required to update the routers within the AZ when compared with a full mesh architecture between all the routers in the AZ.

Figure 9:
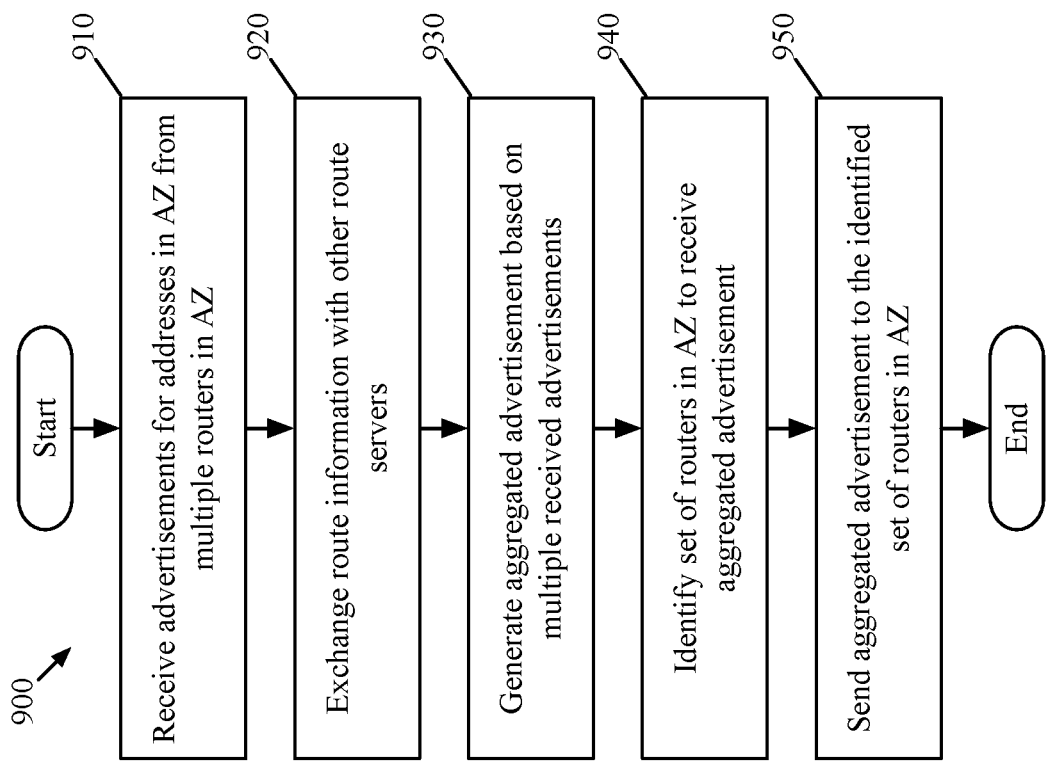
FIG. 9 conceptually illustrates a process for a route server that receives route advertisements and generates route advertisements to other routers based on the received advertisements.

A set of route servers (e.g., route servers 130), in some embodiments, receives the advertisements discussed in relation to FIGS. 5-8. FIG. 9 conceptually illustrates a process 900 for a route server that receives route advertisements and generates route advertisements to other routers based on the received advertisements. Process 900, in some embodiments, is performed by a route server in a set of route servers for an AZ that each receive advertisements from, and generate advertisements for, a different set of assigned routers in the AZ. In some embodiments, the different sets of assigned routers overlap to ensure that each router will receive advertisements even in the case of a route server failure. In other embodiments, the different sets of assigned routers are distinct to avoid conflicting advertisements.

Process 900 begins by receiving (at 910) a set of advertisements for addresses in the AZ from multiple routers in the AZ. The multiple routers, in some embodiments, are in the set of assigned routers from which the route server receives advertisements and to which the route server generates and sends advertisements. The received advertisements, in some embodiments, include the virtual IP addresses associated with L4 and L7 services, and IP addresses associated with the L7 service DCNs on which the L7 services execute. In some embodiments, the advertisement identifies either the IP address of the L7 service DCN or a VTEP as the address at which the VIPs of the L7 services are available. Gateway devices of the AZ that receive multiple addresses (e.g., multiple VTEP addresses or L7 service DCN IP addresses) associated with a VIP, in some embodiments, include each received address as a possible next hop to be selected by a load balancing operation (e.g., an equal cost multi-pathing (ECMP) operation). In some embodiments in which the number of service instances is greater than the AZ gateway device can use in an ECMP operation, there is an additional load balancing operation introduced before the service instances, or additional VIPs are associated with the service to allow the ECMP to be performed for each VIP over a smaller number of service instances.

After receiving (at 910) the advertisements from the multiple routers in the AZ, the route server exchanges (at 920) route information with other route servers to maintain accurate routing information for the AZ. In some embodiments, the exchange of routes between route servers is performed as each route server receives advertisements, such that operation 920 includes only sending information about the received advertisements and receiving information from other route servers is independent of the exchange in operation 920. In some embodiments, the exchange is made thought a set of advertisements (e.g., BGP or MP-BGP advertisements). In other embodiments, control plane messages are used to synchronize the routes received at each route server.

After exchanging (at 920) route information with other route servers, the process 900 generates (at 930) at least one aggregated advertisement based on at least the multiple received advertisements. In some embodiments, the at least one aggregated advertisement is also based on route information received from other route servers. An aggregated advertisement, in some embodiments, includes only a set of routes that were not included in previous advertisements, while in other embodiments, all active routes are advertised in order to identify the routes as active and avoid invalidating an active route based on a timing out or cleanup operation at a router. In some embodiments, the process generates (at 930) multiple aggregated advertisements. The multiple aggregated advertisements, in some embodiments, include advertisements for different routers executing on different host computers that only include routes relevant to the host computer. In other embodiments, different aggregated advertisements are generated for each unique route distinguisher. In some embodiments, the multiple aggregated advertisements include different advertisements for different subsets of routers in the assigned set of routers executing in host computers in the AZ. In some embodiments, the multiple aggregated advertisements include different advertisements for different subsets of routers in the AZ, such as the different assigned set of routers executing in host computers in the AZ, a set of routers in the intervening fabric, and a set of gateway routers of the AZ including routes relevant to each set of routers.

Once the at least one aggregated advertisement is generated (at 930), a set of routers in the AZ is identified (at 940) for receiving the at least one generated aggregated advertisement. Identifying the set of routers in the AZ, in some embodiments, includes identifying a set of routers to receive each generated aggregated advertisement. As described above, different aggregated advertisements are generated, in some embodiments, for different sets of routers and identifying the set of routers includes identifying a set of routers to receive each generated aggregated advertisement. In embodiments in which a single aggregated advertisement is generated, identifying the set of routers includes identifying all the routers in the AZ set of assigned routers for the route server. Once the set of routers for receiving the generated aggregated advertisements is identified (at 940), the aggregated advertisements are sent to the identified set of routers in the AZ and the process ends. In some embodiments, the advertisements are made using a standard advertisement protocol (e.g., BGP, MP-BGP, IS-IS, etc.).

Figure 10:
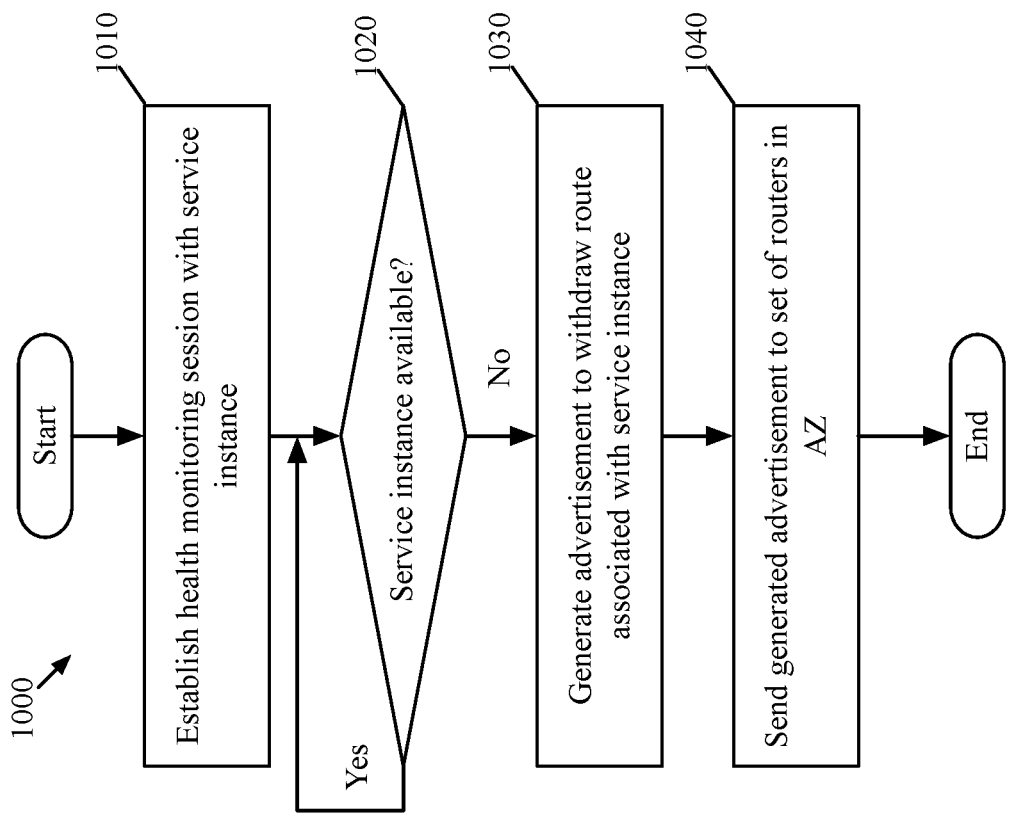
FIG. 10 conceptually illustrates a process for monitoring the health of an individual service instance and advertising a failure of the service instance to routers in the AZ.

The route server, in some embodiments is responsible for monitoring the availability of services (e.g., the health of service instances) in the AZ and handling service instance failure advertisement. Alternatively, or additionally, a set of controller computers or a routing instance executing on a same host computer as a service instance, in some embodiments, is responsible for monitoring the availability of a service instance executing on a particular host computer and handling service instance failure advertisement. FIG. 10 conceptually illustrates a process 1000 for monitoring the health of an individual service instance and advertising a failure of the service instance to routers in the AZ. Process 1000 begins by establishing a monitoring session with a service instance. In some embodiments, the monitoring session is a bidirectional forwarding detection (BFD) session or any other monitoring protocol known to one of ordinary skill in the art.

The process 1000 then determines (at 1020) if the service is still available sung the monitoring protocol. In some embodiments, the service is determined to still be available if the network element (e.g., route server, routing instance, or controller computer) receives a heartbeat packet or other indication that the service instance is available based on the monitoring protocol used. If the service is determined (at 1020) to still be available, the process continues to determine whether the service is available. The determination may be made periodically based on a period of expected heartbeat packets or other indications of availability (e.g., every 50 ms, 100 ms, etc.). If the service is determined (at 1020) to be unavailable (e.g., based on the criteria for the monitoring protocol), an advertisement is generated to withdraw the route associated with the service instance from routers in the AZ.

After generating (at 1030) the withdrawal advertisement, the generated withdrawal advertisement is used to advertise the withdrawal of the route associated with the service instance from routers in the AZ. In some embodiments in which a routing instance or controller computer monitor the availability of the service instance, the advertisement is made to at least one route server associated with the routing instance or controller computer. In such embodiments, the route server then propagates the advertisement to other route servers and routers in the AZ. In embodiments in which the route server monitors the health of the service instance, the route server advertises the withdrawal of the route associated with the service instance to other route servers and routers in the AZ itself.

In some multi-tenant embodiments, the routing instance is a multi-tenant routing instance that maintains separate virtual routing and forwarding (VRF) contexts for each tenant. In some embodiments, the routing instance is a BGP instance. In some embodiments, the routing instance is a multi-protocol BGP instance (MP-BGP) that supports multiple addressing protocols (e.g., multi-protocol label switching (MPLS), BGP-labeled unicast (BGP-LU), segment routing (SR), etc.). The different VRF contexts, in some embodiments, are distinguished by route distinguishers and route targets are used to identify advertisements relevant to each VRF context.

Figure 11:
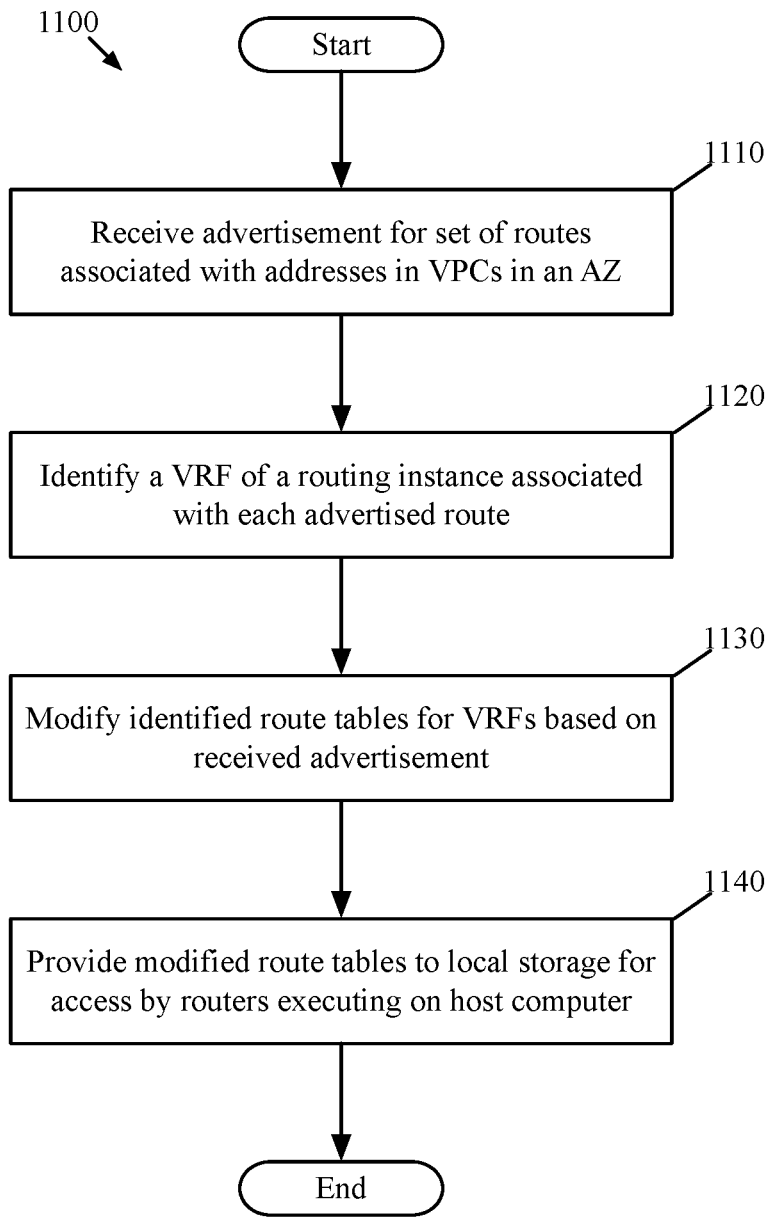
FIG. 11 conceptually illustrates a process for updating routing information at a multi-tenant routing instance.
Figure 12:
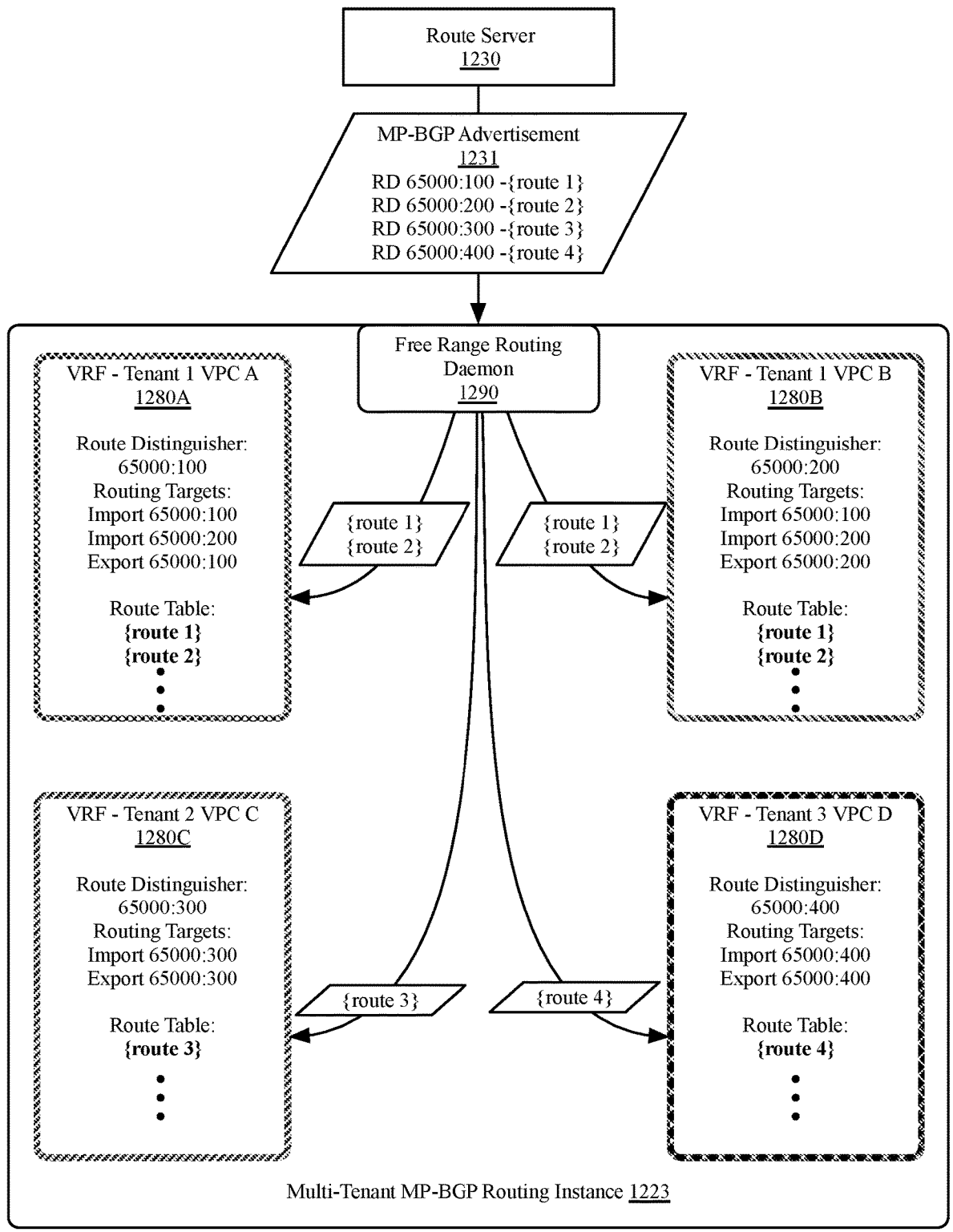
FIG. 12 illustrates a multi-tenant MP-BGP routing instance receiving a route advertisement at a free range routing (FRR) daemon from a route server and updating route tables of virtual routing and forwarding contexts.

FIG. 11 conceptually illustrates a process 1100 for updating routing information at a multi-tenant routing instance. FIG. 12 illustrates a multi-tenant MP-BGP routing instance 1223 receiving a route advertisement at a free range routing (FRR) daemon (i.e., a MP-BGP daemon) from a route server 1230 and updating route tables of VRFs 1280A-1280D. FIG. 12 will be discussed in the context of the discussion of FIG. 11. Process 1100, in some embodiments, is performed by a multi-tenant MP-BGP routing instance (e.g., routing instance 1223 or FRR daemon 1290) executing on a host computer. The process 1100 begins by receiving (at 1110) an advertisement (e.g., MP-BGP advertisement 1231) for routes for a set of addresses (e.g., routes 1-4) associated with at least one VPC in an AZ. Sets of advertised routes associated with different VPCs, in some embodiments, are each advertised in separate advertisements. In other embodiments, a single advertisement (e.g., MP-BGP advertisement 1231) includes sets of addresses for different VPCs with advertisements for each different VPC associated with a different VPC identifier (e.g., a route distinguisher).

After receiving (at 1110) the advertisement, a virtual routing and forwarding (VRF) context associated with each advertised address is identified (e.g., by the multi-tenant MP-BGP routing instance 1223 or FRR daemon 1290). In some embodiments, identifying the VRF context includes identifying a route distinguisher associated with the advertised address and the route targets associated with each VRF context. As illustrated in FIG. 12, a single VRF context can be associated with multiple route distinguishers (e.g., by specifying multiple import route targets). For example, VRFs 1280A and 1280B are both associated with a same tenant and are each associated with route targets for both VRFs (i.e., route target 65000:100 and 65000:200) associated with the tenants VPCs. Other VRF contexts are associated with a single route target (e.g., either 65000:300 or 65000:400 for VRFs 1280C and 1280D respectively).

After identifying (at 1120) the VRFs associated with each advertised route, the route tables of each identified VRF are modified (at 1130) with the associated advertised routes. The modification, in some embodiments, is a removal of a route in the case of a withdrawal advertisement, and the addition of a route in the case of an advertisement adding a new route to an address. For example, the advertisement 1231 includes routes 1 and 2 associated with route distinguishers 65000: 100 and 65000:200, respectively, that are associated with VPCs for Tenant 1. Based on the route distinguishers, VRFs 1280A and 1280B that specify import route targets 65000: 100 and 65000:200 add routes 1 and 2. Based on the advertisement for route 3 being associated with route distinguisher 65000:300, route 3 is added to the route table for VRF 1280C based on the specified import route target 65000:300. Additionally, based on the advertisement for route 4 being associated with route distinguisher 65000:400, route 4 is added to the route table for VRF 1280D based on the specified import route target 65000:400.

After modifying (at 1130) the route tables of the identified VRFs, the modified route tables are provided (at 1140) to a local storage (e.g., a configuration data storage) for access by routers (e.g. logical routers, software routers, etc.) to update their route tables to make forwarding decisions for data messages processed by the router and the process ends. Providing the route tables to the local storage, in some embodiments, includes providing the route tables to a communication proxy (e.g., a VMCI proxy) that intermediates between the routing instance and the local storage. In some embodiments, each router registers with the local storage or a local controller that provides access to the local storage to receive updates for specific route tables (e.g., specific VRF route tables). Registering with the local storage, in some embodiments, includes initiating a long-pull to receive the updated route tables.

Figure 13:
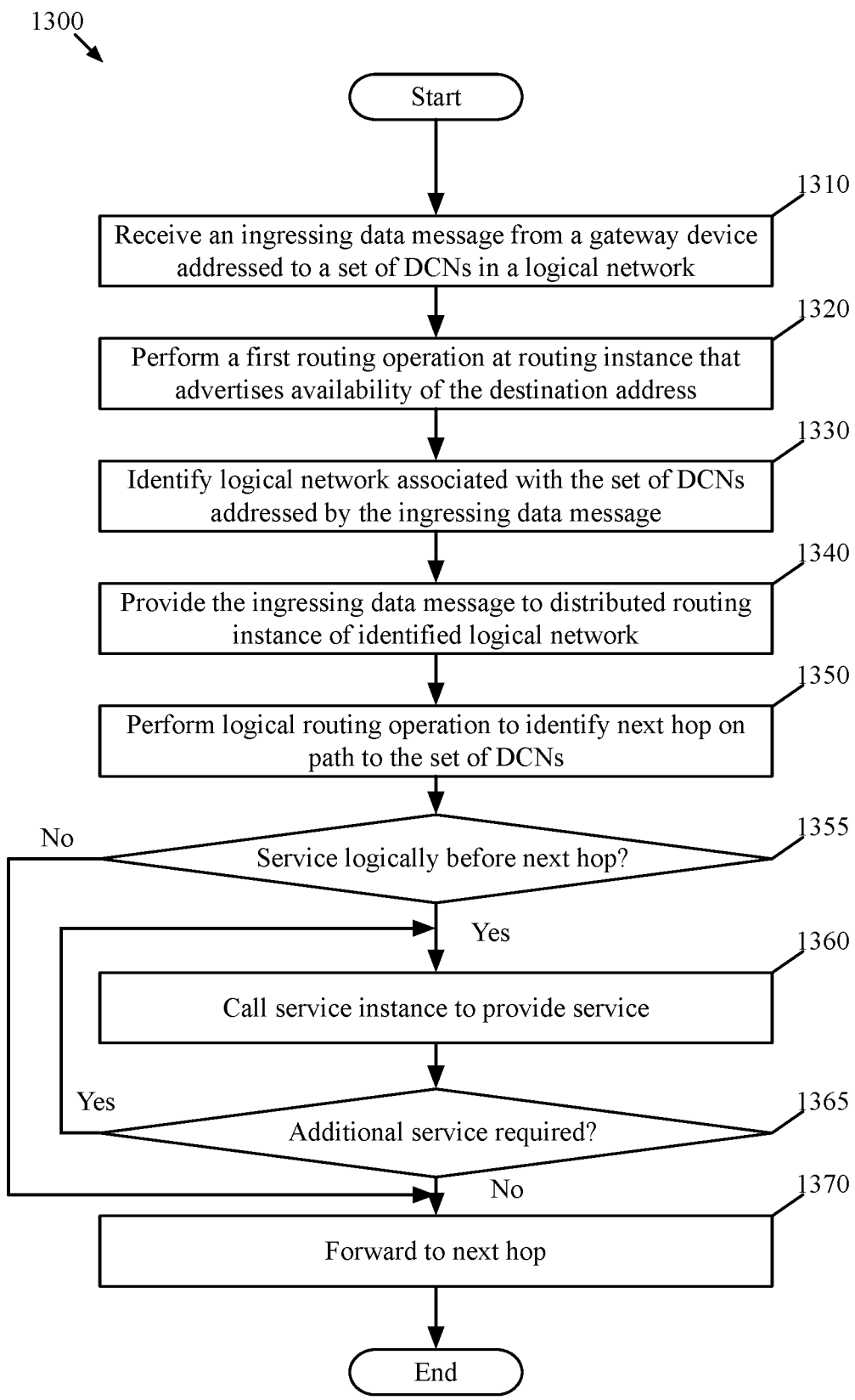
FIG. 13 conceptually illustrates a process for processing data messages addressed to a service or DCN executing on the host computer.

A host computer in the novel architecture, upon receiving a data message ingressing into the VPC and destined for a set of one or more DCNs in the VPC, performs a set of processing steps before delivering the data message to a destination DCN. FIG. 13 conceptually illustrates a process 1300 for processing data messages addressed to a service or DCN executing on the host computer. While the process is described as being performed by the host computer, one of ordinary skill in the art will appreciate that the different operations are, in some embodiments, performed by different components of the host computer. The process 1300 begins by receiving (at 1310) an ingressing data message from a gateway device addressed to a set of DCNs in a logical network. In some embodiments, the host computer receives the data message at a managed forwarding element (MFE) (e.g., a software switch executing on the host computer). The MFE, in some embodiments, provides the received data message to the routing instance to determine a next hop. The data message, in some embodiments, is received at the routing instance that advertises the availability of the destination network (e.g., IP) address.

In some embodiments, the set of DCNs is a single DCN that is specifically addressed by the ingressing data message. The set of DCNs, in some embodiments, is a set of DCNs for which load balancing is provided by a load balancing service instance executing on the host computer. In some embodiments, the set of DCNs includes a set of one or more DCNs executing on the host computer, while in other embodiments, the set of DCNs includes only DCNs executing on other host computers. In some embodiments in which a load balancing service instance performs load balancing for the set of DCNs including DCNs executing on the host computer, the DCNs executing on the host computer are preferentially selected to receive the data message. The preference, in some embodiments, is expressed as a higher weighting for a weighted load balancing algorithm, or an added cost for forwarding the data message to a DCN executing on another host (e.g., adding a constant value to a measurement of load on DCNs on other host computers).

After receiving (at 1310) the ingressing data message, a first routing operation is performed (at 1320) at a routing instance that advertised the availability of the destination network (e.g., IP) address to the other routers in the AZ. The routing, instance in some embodiments, is a multi-tenant routing instance that uses information in a header of the ingressing data message (e.g., a route distinguisher in an MPLS header, a VNI in a VXLAN header, etc.) to identify a VRF context to use to perform the routing operation for the ingressing data message. The routing operation identifies a next hop for the data message and, in some embodiments, includes any, or all, of a decapsulation operation, an encapsulation operation, or other operation for modifying the packet as necessary to reach a destination of the ingressing data message. The next hop for data messages ingressing into the VPC, in some embodiments, is a tunnel endpoint (e.g., virtual extensible local area network VXLAN tunnel endpoint (VTEP)). In other embodiments, in which the routing instance has advertised the availability of the destination IP address of the ingressing data message at the VTEP, operations 1310 and 1320 are not performed as the data message is sent directly to the VTEP. In embodiments with two VTEPs executing on the host computer, the destination address is associated with a particular VTEP executing on the host computer.

In embodiments in which the VTEP receives the ingressing data message, the VTEP identifies (at 1330) a logical network associated with the set of DCNs addressed by the ingressing data message. The identification, in some embodiments, includes identifying a local VNI for a tenant logical network that corresponds to a VXLAN VNI included in the ingressing data message, removing a VXLAN header of the data message and replaces it with a logical network header (e.g., a VLAN header) with the local VNI to provide the data message to a distributed logical router associated with the logical router identifier. The identification, in other embodiments, includes identifying an interface associated with a logical network based on information included in the ingressing data message. In some embodiments, the VTEP serves as a tunnel endpoint for multiple logical networks implemented on the host computer. The multiple logical networks, in some embodiments, are for different tenants.

After identifying (at 1330) the logical network associated with the set of DCNs addressed by the ingressing data message, the ingressing data message is provided (at 1340) to a distributed logical router instance of the identified logical network executing on the host computer. In some embodiments, the distributed logical router is defined at the logical edge of the VPC such that all traffic ingressing into, and egressing from, the VPC is processed through the distributed logical router. The distributed logical router instance, in some embodiments, is a managed physical routing element (MPRE) that performs logical routing (e.g., implements a logical router) for distributed logical routers of multiple tenants. In other embodiments, an MPRE executes on the host computer for each tenant to perform logical routing for the tenant's distributed logical router.

After providing (at 1340) the ingressing data message to the distributed logical router instance, logical routing operations are performed (at 1350) to identify a next hop for the ingressing data message towards the set of DCNs. In some embodiments, the distributed logical router instance implements, along with distributed logical router instances in other host computers, distributed logical edge router that performs edge services for the logical network instead of configuring a set of physical gateway devices of the AZ to perform the edge services. Performing the logical routing at the distributed logical routing instance, in some embodiments, includes determining (at 1355) whether a service is logically configured to be performed before reaching the next hop. In other embodiments, the determination is made (at 1355) as part of a logical forwarding operation at a logical interface (e.g., port) of the distributed logical router performing the logical routing operation (or of the logical interface of the next hop logical router or logical switch). If the process 1300 determines (at 1355) that no service is logically configured between the logical router and the next hop, the process proceeds to operation 1370 and forwards the data message to the next hop, as discussed below, and the process ends.

The distributed logical router processing operation, in some embodiments, identifies a set of services (e.g., stateful or stateless edge services) that are required for processing the data message ingressing into the VPC. The set of services, in some embodiments, includes any or all of a firewall service, a network address translation (NAT) service, a load balancing service, a distributed intrusion detection system (IDS) service, and a distributed intrusion protection system (IPS) service. Different services use different information contained in the data message and, in some embodiments, are implemented in different ways based on the type of information used. For example, services using information contained within a header for layer 4 of the open systems interconnection (OSI) model (sometimes referred to as "L4 services") are executed in a kernel space because they do not consume a lot of resources and moving them into the user space would slow them down unacceptably. However, services using data at layer 7 of the OSI model (sometimes referred to as "L7 services"), in some embodiments, execute in a user space because of their resource-intensive processing that could occupy threads in a kernel space meant for quickly processing data messages and because the cost of moving into the user space is not as significant compared to the cost of performing the operation in the first place.

Sets of services, in some embodiments, are implemented for multiple tenants in separate VPCs on a same host computer as described above in relation to FIG. 3. In some embodiments, the different services are provided by different modules (containers, applications, etc.) in a multi-tenant service machine (or pod). In some embodiments using a multi-tenant service machine, the service machine executes a separate VTEP to distinguish the traffic for each tenant. In other embodiments, each tenant is provided with a separate service machine (e.g., virtual machine, container, pod, etc.) to implement the set of L7 services for the tenant.

If the process 1300 determines (at 1355) that the service is logically configured to be performed before reaching the logical switch, the service is called (at 1360). In some embodiments, calling the service includes providing the ingressing data message to a service instance (e.g., a program, module, application, etc.) executing on the host computer. The service instance, in some embodiments, returns the serviced data message to a logical interface of the distributed logical routing instance (e.g., to a logical interface) from which it was received. In other embodiments, the service is part of a processing pipeline (e.g. a distributed logical router processing pipeline) and the service provides the serviced data message to the next stage or operation in the processing pipeline. The service, in some embodiments, is a load balancing service (e.g., a distributed load balancing service) that executes in the kernel of the host computer and performs the load balancing service based on parameters in header values relevant to layers 1-4 of the OSI model (i.e., a layer 4 (L4) service). The service, in other embodiments, is a firewall service or any other middlebox service that can be performed between a router and switch.

After the service is provided, the process 1300 determines (at 1365) whether an additional service is logically configured before reaching the next hop. In some embodiments, the determination is made implicitly by a processing pipeline that either does or does not include additional services before forwarding the data message to the next hop. In other embodiments, the distributed logical router instance performs a subsequent routing operation on the service ingressing data message to determine whether an additional service is logically configured before reaching the next hop towards the destination DCN. The determination made by the distributed logical router instance, in some embodiments, is made implicitly by determining that the data message should be provided to a service instance based on a routing rule (e.g., a policy-based routing rule).

If the process 1300 determines (at 1365) that an additional service is logically configured before reaching the next hop, the process returns to operation 1360 to call the additional service as described above. However, if the process 1300 determines (at 1365) that no additional service is logically configured before reaching the next hop, the data message is forwarded to the next hop and the process ends. The next hop, in some embodiments, is a destination DCN (e.g., a container, pod, VM, etc.) associated with the destination IP address of the ingressing data message. The destination DCN for some ingressing data messages is a particular DCN addressed by the ingressing data messages. For other ingressing data messages addressed to a VIP, the destination DCN identified by the routing operations is a middlebox service DCN that provides a load balancing or other service for a set of DCNs associated with the destination address of the ingressing data messages. The middlebox service DCN, in some embodiments, performs the service and identifies a DCN in the set of DCNs associated with the destination address (e.g., performing a load balancing service to identify a DCN to receive the ingressing data message) and forwards the ingressing data message to the identified DCN. One of ordinary skill in the art will understand that additional logical forwarding elements and service instances may exist along the path to the destination DCN and, in some embodiments, will be processed similarly to operations 1350-1370.

Figure 14:
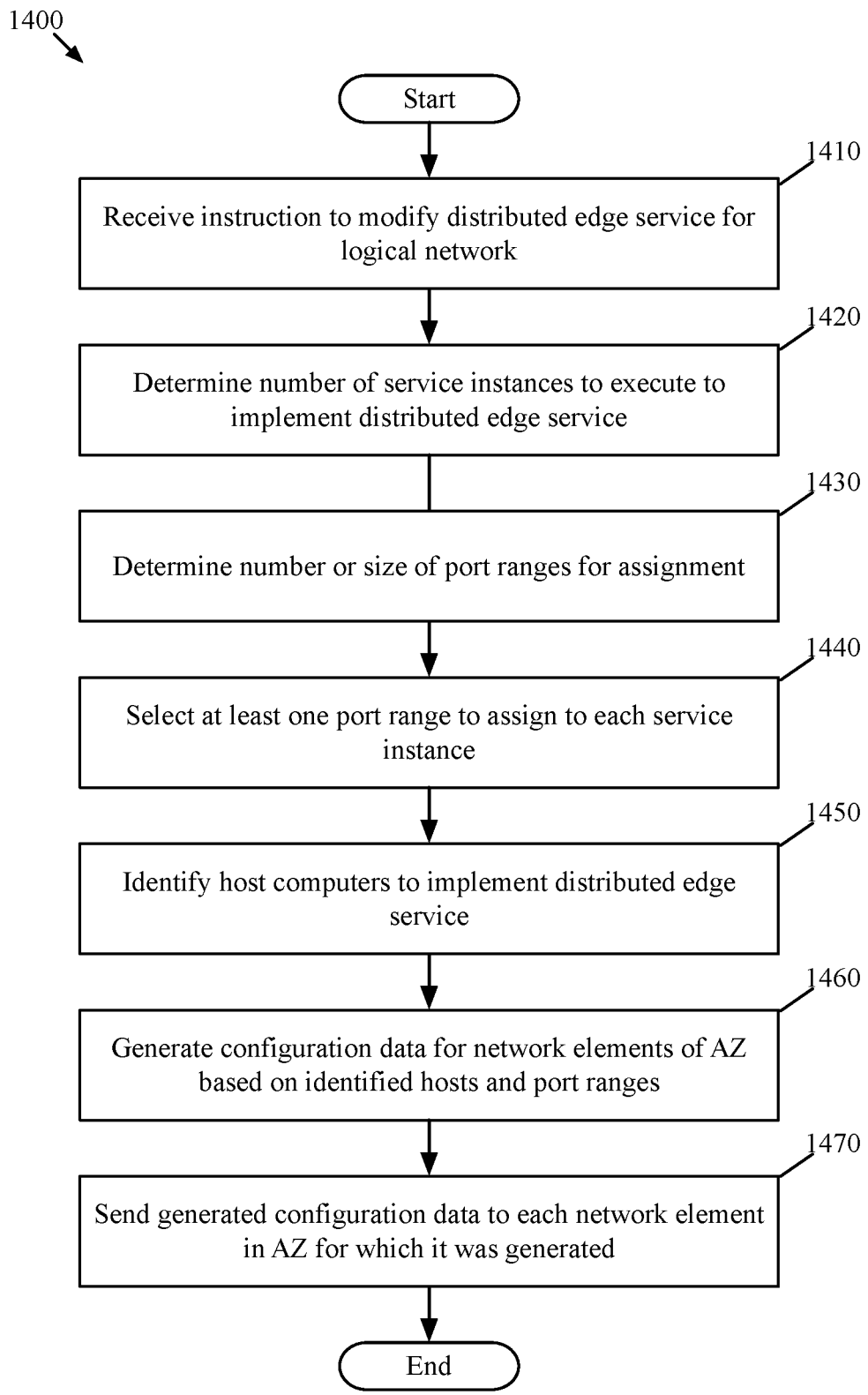
FIG. 14 conceptually illustrates a process for generating configuration data for different network elements that provide a novel network architecture for advertising routes in an availability zone and for providing a set of distributed services at the edge of a VPC.

In some embodiments, a controller computer cluster (i.e., a set of one or more controller computers) of a VPC (e.g., a logical network) in the AZ provides configuration information to network elements to implement the VPC. FIG. 14 conceptually illustrates a process 1400 for generating configuration data for different network elements that provide a novel network architecture for advertising routes in an availability zone (e.g., a datacenter providing a set of hardware resources) and for providing a set of distributed services at the edge of the VPC. In some embodiments, process 1400 is performed by a controller computer or a controller computer cluster. In some embodiments, the controller computer cluster includes management plane controller computers. In some embodiments, the process 1400 is performed each time a new distributed edge service is added to a logical network or a distributed edge service instance (e.g., a middlebox service instance) is spun up or added to a host computer in the AZ for an existing distributed edge service.

Process 1400 begins by receiving (at 1410) an instruction to modify a distributed edge service in a logical network (e.g., a VPC). In some embodiments, the modification instruction is an instruction to add a distributed edge service that was previously not provided in the logical network. In other embodiments, the modification instruction is an instruction to add a distributed edge service instance to a set of distributed edge service instances that are currently providing the distributed edge service. In some embodiments, the received instruction is generated by the controller computer or controller computer cluster performing process 1400 based on a policy that specifies when a particular distributed edge service or a distributed edge service instance should be added to a logical network.

After receiving (at 1410) the instruction to modify a distributed edge service the process 1400 determines (at 1420) a number of distributed service instances to execute to implement the distributed edge service for the logical network. In some embodiments, determining the number of the distributed service instances includes identifying (1) active distributed service instances and (2) distributed service instances that have been requested to be activated (e.g., spun up). Identifying the distributed service instances, in some embodiments, includes identifying the number of end machines (e.g., DCNs, workload VMs, containers, etc.) that each distributed service instance supports (i.e., provides the distributed service for). In some embodiments, in addition to identifying the number of end machines, identifying the distributed service instances includes identifying either or both of (1) a total number of connections being handled by the distributed service (i.e., a sum over all the distributed instances) and (2) a number of connections being handled by each distributed service instance.

After determining (at 1420) the number of distributed service instances, the process 1400 determines (at 1430) a number of port ranges or a size of port ranges that will be available for assignment to distributed service instances of particular distributed services such as a distributed network address translation service. In some embodiments, the number of port ranges or the size of the port ranges is determined based on input from a user (e.g., an administrator) of the VPC or a logical sub-network within the VPC. The input from the user may be based on a maximum amount of resources that the user desires a distributed service instance to consume in providing the distributed service. The user input, in some embodiments specifies any or all of (1) a maximum number of distributed service instances that can be instantiated, (2) a maximum number of ports that can be assigned to a single distributed service instance, or (3) policies for determining the number of ports assigned to particular distributed service instances. The policies, in some embodiments, are based on any or all of (1) a number of active distributed service instances, (2) a number of compute nodes for which each active distributed service instance provides the distributed service, (3) a number of connections being handled by the distributed service, and (4) the number of connections being handled by each distributed service instance.

For example, a policy may specify that a division of the entire range of possible port numbers be divided into a power of two that is at least twice as large as (or as large as) the number of distributed service instances and that the port number ranges are adjusted based on the policy as the number of distributed service instances increases or decreases (e.g., going from 4 to 5 distributed service instances causes each of 8 port ranges to be divided into two smaller port number ranges, or going from 17 to 16 distributed instances causing 64 port number ranges to be consolidated into 32 port number ranges). The policy, in some embodiments, specifies that each distributed service instance be assigned non-adjacent port number ranges (e.g., 0-8191 assigned to a first distributed service instance, 16384-2475 for the second distributed service instance, etc.). Such a policy allows for increasing and decreasing the number of hosts without having to reassign port number ranges as often.

In some embodiments, the policy may specify that when a particular distributed service instance uses a fraction of the port numbers assigned to the distributed service instance above a threshold fraction (e.g., 0.8 or 0.9) one or all of (a) assigning an adjacent available range to the distributed service instance, (b) migrating workload compute nodes from the host computer on which the distributed service instance executes, or (c) adding a new distributed service instance on another host computer will be performed. Alternatively or additionally, in some embodiments, the policy may specify that when a particular distributed service instance uses a fraction of the port numbers assigned to the distributed service instance below a threshold fraction (e.g., 0.3 or 0.2) the range of port numbers assigned will be reduced or additional end machines will be migrated to the host computer on which the distributed service instance executes (e.g., from a host computer executing a distributed service instance that is using a greater fraction of its assigned port numbers). Other possible policies for handling excess capacity of the distributed service include a policy that specifies that when the total number of connections being handled by the distributed service instances is below a certain threshold fraction of the capacity based on the number of distributed service instances and assigned port ranges that a distributed service instance will be deactivated, or smaller port ranges will be assigned to each active distributed service instance. Other policies may specify assigning port ranges based on a number of workload compute nodes that are provided the distributed service by the distributed service instance (e.g., for 0-10 workload compute nodes, 256 port numbers are assigned; for 11-20 workload compute nodes, 512 port numbers are assigned; etc.). One of ordinary skill in the art will understand that these policies are merely examples of possible policies and that different policies are used in different embodiments according to the requirements of the user.

After determining (at 1430) the port number ranges, the process 1400 selects (at 1440) at least one port range to assign to each distributed service instance. As discussed above, an initial port range assignment, in some embodiments, assigns each distributed service instance a non-adjacent, non-overlapping, port range. Subsequent assignments, in some embodiments, assign at least one additional port number range to particular distributed service instances that use a number of port numbers above a threshold fraction of the assigned port numbers. Other subsequent assignments, in some embodiments, remove a portion of a range of port numbers from an initial assignment to a particular distributed service instance that uses less than a threshold number of port numbers in the initially assigned port number range.

The size of the port number ranges assigned to the distributed service instances, in some embodiments, are fixed by an administrator based on a maximum number of expected distributed service instances (e.g., for an expected maximum of 64 distributed service instances, creating 64 different port number ranges each including 1024 ports that are each assigned to a distributed service instance on startup). In other embodiments, the size of the port number ranges is dynamic and may change based on the number of active distributed service instances, active connections, or workload compute nodes using the distributed service. The port number ranges may also vary in size between distributed service instances. For example, a larger port number range is assigned to a first distributed service instance executing on a host computer executing a larger number of workload compute nodes using the distributed service than a second distributed service instance executing on a host computer executing a smaller number of workload compute nodes using the distributed service and may change as the number of workload compute nodes changes.

After selecting (at 1440) the range of port numbers for each distributed service instance to use, the process 1400 identifies (at 1450) a set of host computers to host distributed edge service instances. The determination, in some embodiments, includes identifying host computers currently executing elements of the logical network for which the distributed edge service instances are being added. After identifying the host computers, the resources of each host computer available for executing additional network elements of the logical network are determined to identify host computers that have sufficient resources to execute a distributed edge service instance. Additional considerations, in some embodiments, include the number of workload DCNs executing on a host that require the distributed edge service, the number of other tenants executing network elements on the host computer, the number of connections currently handled by the host computer, etc.

After identifying (at 1450) the set of host computers to execute distributed edge service instance, the process 1400 generates (at 1460) configuration data for implementing the desired distributed service instances. The generated configuration data for executing a distributed edge service instance, in some embodiments, includes a number of cores (e.g., of a service GM on which the service instance executes) or an amount of other resources assigned to the service instance. In some embodiments, the resources assigned to the service instance is specified using kubernetes (k8s) annotations and converted into configuration data for providing to the host computer 1520 (e.g., to configuration data storage 1528). In some embodiments, configuration data generated for a first L7 service to be executed in a service DCN (e.g., L7 service GM 1522*a*) executing in the host computer 1520, includes configuration data to add the service DCN an IP address in a service segment subnet for a service interface of the DCN in which the L7 service executes.

Figure 15:
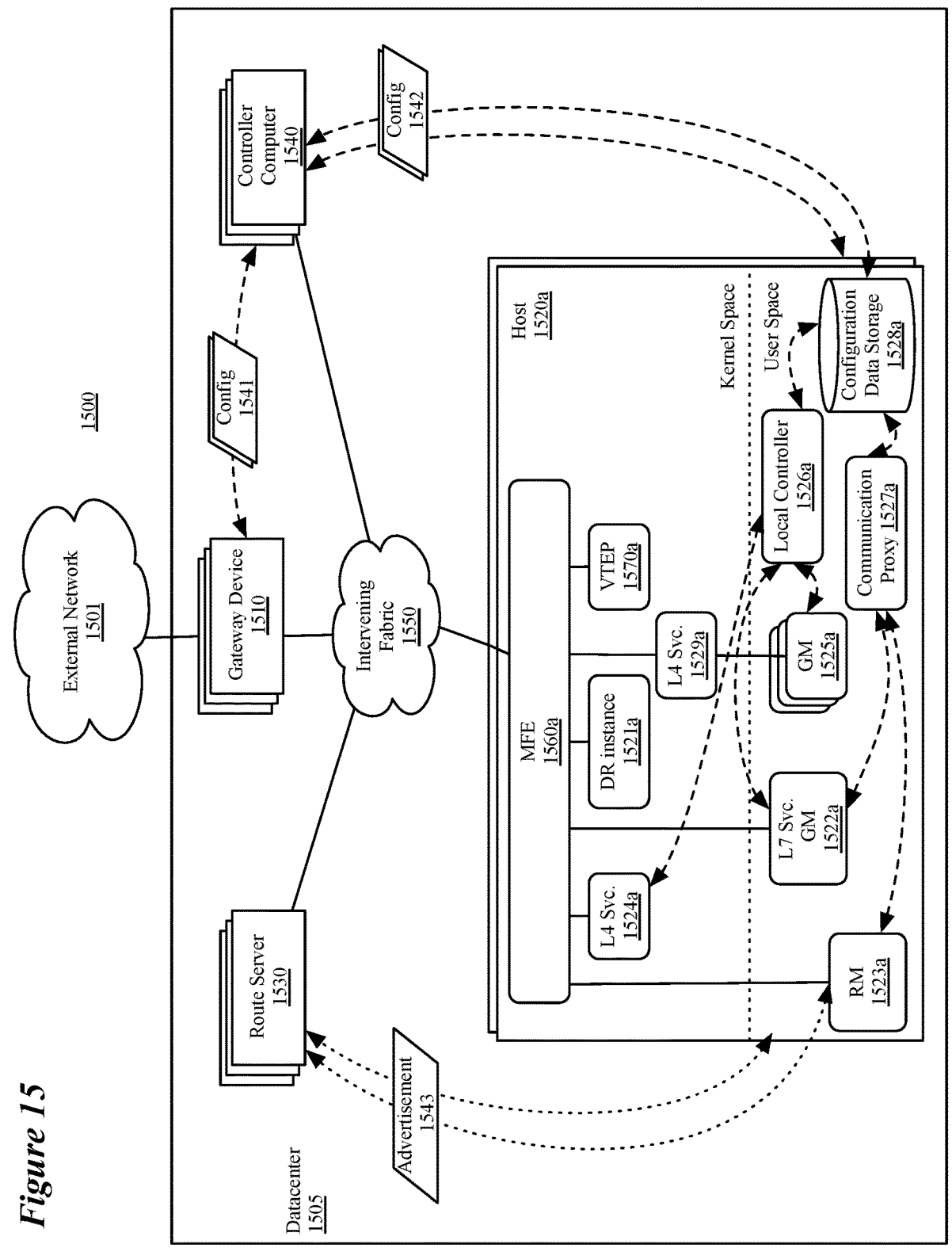
FIG. 15 illustrates a computer controller cluster in a datacenter sending different types of configuration data to different network elements.

The generated configuration data, in some embodiments, includes multiple sets of configuration data for different network elements (e.g., host computers, gateway devices) and for different purposes. FIG. 15 illustrates a computer controller cluster 1540 in a datacenter 1505 sending different types of configuration data to different network elements. The elements of FIG. 15 are generally the same as those discussed in FIG. 1. FIG. 15 illustrates a set of configuration data 1542 for each host computer 1520 (received at configuration data storage 1528). The configuration data 1542, in some embodiments, includes configuration information for (1) configuring the distributed service instance to provide the distributed service, (2) configuring other network elements executing on the host computer (e.g., GMs 1525 and MFE 1560) to communicate with the distributed service instance (e.g., 1524), and (3) configuring a routing instance (e.g., routing machine 1523) executing on a host computer to advertise the IPv6 address associated with a distributed service instance executing on the host computer.

The configuration data storage 1528, in some embodiments, receives the configuration data and identifies the configuration data for each module executing on the host computer 1520 as described in relation to FIG. 4. In some embodiments, the configuration data is pushed from configuration data storage 1528 to local controller 1526 and communication proxy 1527 to be propagated to the different elements being configured on the host computer 1520. In some embodiments, the local controller 1526 is responsible for pushing L4 service configuration data to the dataplane and configuring the host computer to execute DCNs (GMs 1525 and L7 service GM 1522*a*) while the communication proxy 1527 (e.g., a VMCI proxy) is responsible for pushing data from configuration data storage 1528 to the datapath (e.g., nginx) of the DCN (e.g., L7 service GM 1522*a*) in which the L7 services execute.

The configuration data (e.g., configuration data 1542) includes configuration data for configuring at least one distributed service instance executing on at least one host computer to provide the distributed service using an assigned range of port numbers. Configuration data for initializing a new distributed service instance on a host computer includes, in some embodiments, an IPv4 address associated with the distributed NAT service used in performing the distributed service operation (e.g., replacing source IP addresses of data messages going from the first network to an external network) and an assigned port number range. In some embodiments, the configuration data includes a set of policies for providing the distributed service (e.g., firewall rules, load balancing criteria or policies for selecting a DCN to receive a data message, etc.). Additional configuration information (e.g., logical overlay network elements to which the distributed instance connects) is sent, in some embodiments, to the host computer to configure other elements of the host to communicate with the new distributed service instance as will be appreciated by one of ordinary skill in the art. For L7 services executing in a user-space DCN (e.g., a VM, a container, or pod), the configuration data includes, in some embodiments, a VIP associated with the service as well as a service IP address for the user-space DCN in which the L7 service executes.

The additional configuration data sent to the host computer, in some embodiments, includes configuration data sent to the host computer to configure the host computer (or an MFE or BGP instance executing on the host computer) to identify and advertise the IPv6 address prefix associated with the distributed service instance or added DCNs as described in relation to FIGS. 4-8. As discussed in relation to FIG. 4, the configuration data, in some embodiments, also includes information used internally to the host computer to address the distributed service instance and configure machines executing on the host computer to use the distributed service instance for particular packets (e.g., packets destined for external networks).

In some embodiments, the generated configuration data includes configuration data (e.g., configuration data 1541) generated for providing to gateway devices. The controller computer cluster 1540, in some embodiments, sends configuration data 1541 to the set of gateway devices for configuring a gateway device to perform an IPv4 to IPv6 encapsulation and, in some embodiments, for configuring the gateway device with IPv6 routing table entries. The gateway devices, in some embodiments, are partially- or fully-programmable gateway devices that can be programmed by the controller computer cluster to implement the IPv4 to IPv6 translation and encapsulation based on PBR rules specified based on IPv4 address and destination port in an IPv4 header. In other embodiments, the gateway devices are off the shelf gateway devices (e.g., dual stack routers) that are capable of simple programming sufficient to configure the gateway device to implement the IPv4 to IPv6 encapsulation.

For both programmable and off-the-shelf gateway devices the configuration data includes what will be referred to as a set of distributed service records and IPv6 routing table entries. The distributed service records, in some embodiments, map combinations of the IPv4 address used by a particular distributed service operation and destination port number to an IPv6 destination address. The distributed service records in some embodiments, are provided as a lookup table and an instruction to use the lookup table to route data messages using the IPv4 address associated with a distributed service. In some embodiments, the distributed service record is a PBR rule (or similar rule or policy) that defines an algorithm for generating an IPv6 address from an IPv4 destination address and port number. In some embodiments, the PBR rule specifies an IPv4 destination address for which the algorithm should be applied, while in other embodiments, both an IPv4 address and port number are specified. The distributed service record, in some embodiments, is an instruction to configure an off the shelf gateway device to perform IPv6 encapsulation according to a specified algorithm for IPv4 packets destined to the IPv4 used by a particular distributed service operation. In some embodiments, the instruction is based on a functionality provided by the off the shelf gateway device (e.g., an exposed API).

The IPv6 routing table entries, in some embodiments, each identify an IPv6 address prefix associated with a particular host computer in a set of multiple host computers that execute a distributed service instance and a next hop interface to use to reach the particular host computer. The IPv6 address prefix specified in the IPv6 routing entry for a particular host computer is based on the IPv4 address associated with the distributed service and a port number range assigned to the distributed service instance executing on the host computer. If multiple non-adjacent port ranges are assigned to a particular host computer, the set of IPv6 routing table entries includes multiple entries for the particular host computer.

Once the configuration data is generated (at 1460), the configuration data generated for each network element is forwarded (at 1470) to the appropriate network element to be used to configure the network element as described in relation to FIGS. 4-8. The configuration data, in some embodiments, is used at the host computers by a local controller (e.g., local controller 1526) and a VMCI proxy (e.g., communication proxy 1527) after being received by a local agent for communicating with the controller computer cluster (e.g., configuration data storage 1528) that communicates with the controller computer cluster using control plane messages. The local controller and VMCI proxy then provide the configuration data or configures the elements on the host computer to implement the distributed service (e.g., instantiate a distributed service instance, configure GMs to use the distributed service instance, configure a DCN with a service IP and with a set of L7 service instances, and configure an MFE or routing instance to advertise the IPv6 address prefix associated with the distributed service instance, etc.). The configuration data generated for the gateway device is forwarded to the gateway device to configure the gateway device to identify particular host machines associated with particular received packets (e.g., by using the provided IPv6 routing table entries). After forwarding (at 1470) the configuration data, the process ends. One of ordinary skill in the art will understand that, in some embodiments, process 1400 is performed for each distributed service that uses a same IPv4 address as a source address for outgoing packets at each of multiple distributed service instances.

The controller computer cluster, in some embodiments, monitors the load on the distributed service instances and the distributed service in the aggregate periodically or based on a schedule. In some embodiments, the monitoring is based on a program executing on the same host computers as the distributed service instances. The program, in some embodiments, monitors a set of metrics associated with the distributed service instance (e.g., latency, number of connections handled, number of packets per second, number of end machines using the distributed service instance, etc.). In some embodiments, operations 1420 and 1430 are performed whenever a new distributed service instance or workload machine is requested to be initialized. The operations 1420 and 1430 are also performed periodically or based on a schedule set by an administrator, in some embodiments, to determine if the monitoring information indicates that there has been a change requiring reallocation of port number ranges or the size of any port number ranges. If such a change occurs, operations 1440-1470 are then performed to update the allocation of port ranges and provide updated configuration data to the network elements.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
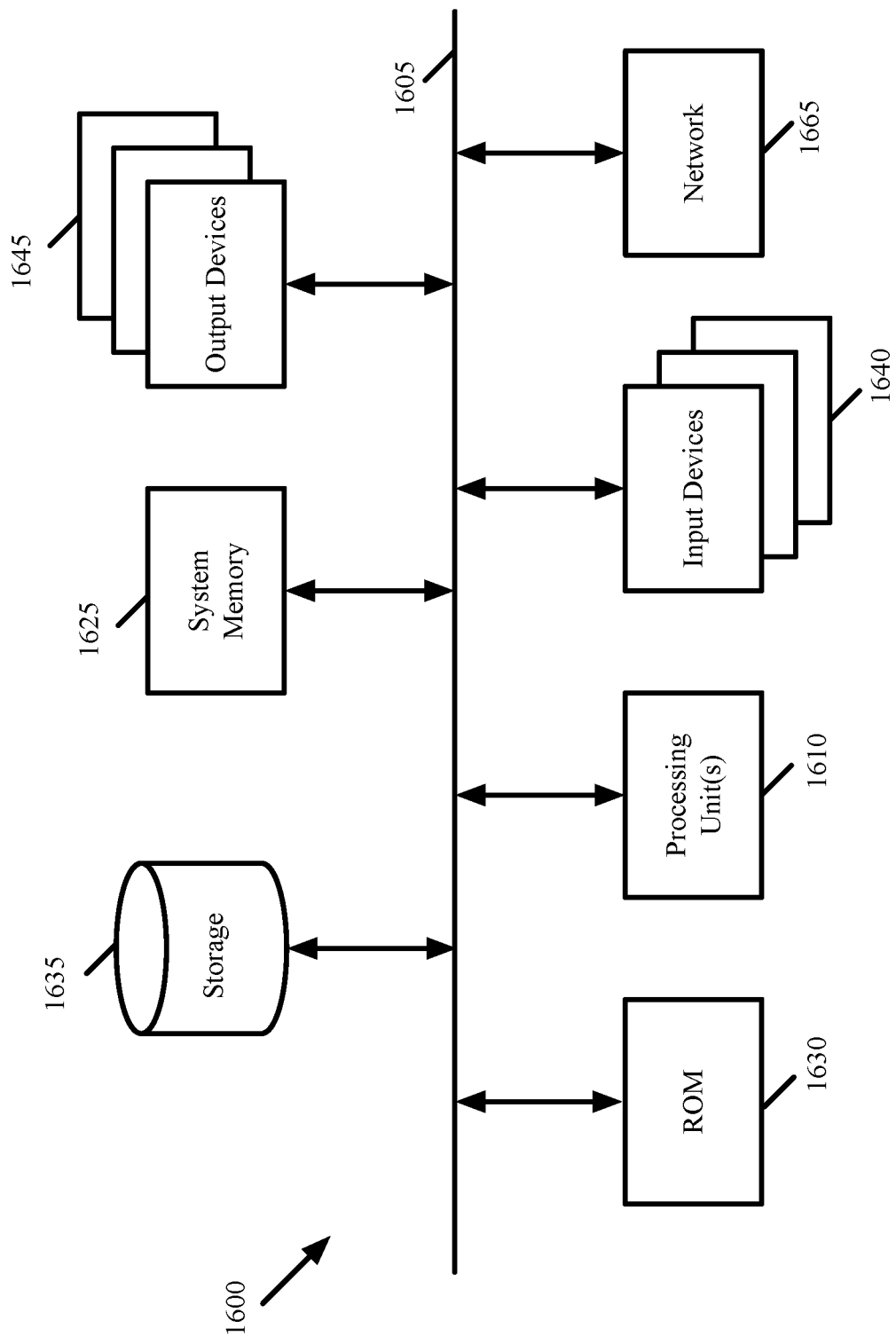
FIG. 16 conceptually illustrates a computer system with which some embodiments of the invention are implemented.

FIG. 16 conceptually illustrates a computer system 1600 with which some embodiments of the invention are implemented. The computer system 1600 can be used to implement any of the above-described hosts, controllers, and managers. As such, it can be used to execute any of the above described processes. This computer system includes various types of non-transitory machine readable media and interfaces for various other types of machine readable media. Computer system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the computer system 1600. For instance, the bus 1605 communicatively connects the processing unit(s) 1610 with the read-only memory 1630, the system memory 1625, and the permanent storage device 1635.

From these various memory units, the processing unit(s) 1610 retrieve instructions to execute and data to process in order to execute the processes of the invention. The processing unit(s) may be a single processor or a multi-core processor in different embodiments. The read-only-memory (ROM) 1630 stores static data and instructions that are needed by the processing unit(s) 1610 and other modules of the computer system. The permanent storage device 1635, on the other hand, is a read-and-write memory device. This device is a non-volatile memory unit that stores instructions and data even when the computer system 1600 is off. Some embodiments of the invention use a mass-storage device (such as a magnetic or optical disk and its corresponding disk drive) as the permanent storage device 1635.

Other embodiments use a removable storage device (such as a floppy disk, flash drive, etc.) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieve instructions to execute and data to process in order to execute the processes of some embodiments.

The bus 1605 also connects to the input and output devices 1640 and 1645. The input devices enable the user to communicate information and select commands to the computer system. The input devices 1640 include alphanumeric keyboards and pointing devices (also called "cursor control devices"). The output devices 1645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 16, bus 1605 also couples computer system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of computer system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For instance, several figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for a routing instance executing on a host computer in a plurality of host computers in a datacenter that execute a plurality of data compute nodes (DCNs) and, together, implement first and second virtual private clouds for first and second tenants of the datacenter, the method comprising:

at the routing instance executing on the host computer;
    detecting that first and second DCNs for respectively the first and second VPCs have been added on the host computer;
    identifying first and second network addresses associated respectively with the added first and second DCNs; and advertising the identified first and second network addresses to a route server for the route server to advertise to first and second sets of host computers in the plurality of host computers that respectively implement the first and second VPCs, wherein the routing instance is a multi-tenant routing instance that maintains first and second virtual routing and forwarding (VRF) contexts for the first and second tenants and uses a border gateway protocol (BGP) to advertise available addresses, and wherein the routing instance is a multi-protocol BGP (MP-BGP) instance that associates each VRF context with a set of different route distinguisher and route target values to identify data messages associated with each VRF context.

2. The method of claim 1, wherein detecting that the first DCN has been added comprises receiving a notification from a controller computer.

3. The method of claim 2, wherein the notification is received through a communication proxy executing on the host computer to communicate with the controller computer over a management network.

4. The method of claim 1, wherein detecting that the first DCN has been added instantiated comprises receiving a notification from the instantiated first DCN.

5. The method of claim 1, wherein the identified first network address is an internal network address used by other DCNs in a logical network.

6. The method of claim 5, wherein the datacenter comprises a gateway device that sits between an external network and the logical network, the method further comprising:

identifying an external network address associated with the added first DCN used by machines in the external network; and advertising the external network address to the route server for the route server to advertise to the gateway device of the datacenter.

7. The method of claim 1, wherein the routing instance registers for notifications relating to the addition of service instances to the host computer.

8. A method for a routing instance executing on a host computer in a plurality of host computers that together implement a distributed edge service for a virtual private cloud (VPC) implemented by the plurality of host computers, the method comprising:

at the routing instance executing on the host computer;

detecting that a service instance has been made available on the host computer to provide a distributed edge service for ingressing data messages entering the VPC from machines outside of the VPC and destined to machines inside of the VPC;

identifying an external network address associated with the distributed edge service used by machines outside the logical network; and advertising the identified external network address to a route server operating outside of the host computer for the route server to advertise to a gateway device of the datacenter for the gateway device to use to direct at least a subset of the ingressing data messages to the host computer for the distributed edge service, wherein the external network address is a first internet protocol version 6 (IPv6) network addresses based on an IP version 4 (IPv4) address associated with the distributed edge service, the IPv6 network address used to address the service instance executing on the host computer, wherein other IPv6 network addresses based on the IPv4 address associated with the distributed edge service are used to address other service instances executing on other host computers in the plurality of host computers.

9. The method of claim 8, wherein detecting that the service instance is available comprises receiving a notification from a controller computer.

10. The method of claim 9, wherein the notification is received through a communication proxy executing on the host computer to communicate with the controller computer over a management network.

11. The method of claim 8, wherein detecting that the service instance is available comprises receiving a notification from the service instance.

12. A method for a routing instance executing on a host computer in a plurality of host computers in a datacenter that execute a plurality of data compute nodes (DCNs) and, together, implement first and second virtual private clouds (VPCs) for first and second tenants of the datacenter, the method comprising:

at the routing instance executing on the host computer;

detecting that first and second service instances have been made available on the host computer for respectively providing first and second distributed edge services for ingressing data messages entering respectively the first and second VPCs from machines outside of the first and second VPCs and destined to machines inside of the first and second VPCs;

identifying first and second network addresses associated respectively with the instantiated first and second service instances; and advertising the identified first and second network addresses associated with the first and second service instances to a route server operating outside of the host computer for the route server to advertise to a gateway device of the datacenter for the gateway device to use to direct at least a subset of the ingressing data messages to the host computer for the first and second distributed edge services.

13. The method of claim 12, wherein the routing instance is a multi-tenant routing instance that maintains first and second virtual routing and forwarding (VRF) contexts for the first and second tenants and uses a border gateway protocol (BGP) to advertise available addresses.

14. The method of claim 13, wherein the routing instance is a multi-protocol BGP (MP-BGP) instance that associates each VRF context with a set of different route distinguisher and route target values to identify data messages associated with each VRF context.

15. The method of claim 8, wherein the routing instance registers for notifications relating to the addition of service instances to the host computer.

* * * * *